US011496955B2

(12) United States Patent
Takano

(10) Patent No.: US 11,496,955 B2
(45) Date of Patent: Nov. 8, 2022

(54) TERMINAL DEVICE AND INFORMATION PROCESSING APPARATUS

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 185 days.

(21) Appl. No.: 14/888,510

(22) PCT Filed: Jun. 13, 2014

(86) PCT No.: PCT/JP2014/065743
§ 371 (c)(1),
(2) Date: Nov. 2, 2015

(87) PCT Pub. No.: WO2015/015924
PCT Pub. Date: Feb. 5, 2015

(65) Prior Publication Data
US 2016/0112979 A1    Apr. 21, 2016

(30) Foreign Application Priority Data

Jul. 31, 2013 (JP) .............................. JP2013-158874

(51) Int. Cl.
*H04W 48/18* (2009.01)
*H04W 76/14* (2018.01)
(Continued)

(52) U.S. Cl.
CPC ........... *H04W 48/18* (2013.01); *H04W 8/005* (2013.01); *H04W 56/002* (2013.01);
(Continued)

(58) Field of Classification Search
CPC ............ H04W 48/18; H04W 56/0015; H04W 56/0025; H04W 72/042; H04W 72/0433;
(Continued)

(56) References Cited

U.S. PATENT DOCUMENTS

2011/0268101 A1   11/2011  Wang et al.
2012/0120892 A1   5/2012   Freda et al.
(Continued)

FOREIGN PATENT DOCUMENTS

CN     1549612 A    11/2004
CN    101227726 A    7/2008
(Continued)

OTHER PUBLICATIONS

"Initial Views on Unified Approach for D2D Discovery", NTT Docomo, 3GPP TSG RAN WG1 Meeting#73, R1-132371, Total 7 Pages, (May 20-24, 2013).
(Continued)

*Primary Examiner* — Kibrom T Hailu
*Assistant Examiner* — Nizam U Ahmed
(74) *Attorney, Agent, or Firm* — Xsensus LLP

(57) ABSTRACT

[Object] To simplify the operation of a terminal device for performing D2D communication in which the same communication scheme as the communication scheme of cellular communication is adopted.
[Solution] Provided is a terminal device including: a detection unit configured to detect a synchronization signal for wireless communication with a base station; and a control unit configured to control transmission of a synchronization signal for inter-device communication. A radio frame used in the wireless communication with the base station and a radio frame used in the inter-device communication have a same frame structure. A timing of the synchronization signal for the inter-device communication in the same frame structure is same as a timing of the synchronization signal for the wireless communication with the base station in the same frame structure.

14 Claims, 19 Drawing Sheets

(51) Int. Cl.
*H04W 56/00* (2009.01)
*H04W 8/00* (2009.01)
*H04W 72/04* (2009.01)
*H04W 72/12* (2009.01)
*H04W 92/18* (2009.01)
*H04W 88/06* (2009.01)
*H04W 88/10* (2009.01)

(52) U.S. Cl.
CPC ... *H04W 56/0015* (2013.01); *H04W 56/0025* (2013.01); *H04W 72/042* (2013.01); *H04W 72/0433* (2013.01); *H04W 72/1215* (2013.01); *H04W 76/14* (2018.02); *H04W 88/06* (2013.01); *H04W 88/10* (2013.01); *H04W 92/18* (2013.01)

(58) Field of Classification Search
CPC ........... H04W 72/1215; H04W 76/023; H04W 88/06; H04W 88/10; H04W 8/005; H04W 92/18; H04W 56/002
USPC ........................................................ 370/336
See application file for complete search history.

(56) References Cited

U.S. PATENT DOCUMENTS

| | | |
|---|---|---|
| 2013/0077512 A1 | 3/2013 | Chang et al. |
| 2013/0107801 A1 | 5/2013 | Zheng |
| 2013/0148566 A1* | 6/2013 | Doppler ............... H04W 76/40 370/312 |
| 2013/0310016 A1* | 11/2013 | Park ..................... H04W 4/70 455/418 |
| 2014/0219270 A1* | 8/2014 | Ro ...................... H04W 56/001 370/350 |
| 2015/0305075 A1* | 10/2015 | Fodor .................. H04W 8/005 370/329 |
| 2015/0382252 A1* | 12/2015 | Yu ..................... H04W 36/0055 370/331 |
| 2016/0165559 A1* | 6/2016 | Nagata ................ H04W 56/002 370/350 |
| 2016/0374038 A1* | 12/2016 | Wang ................. H04W 72/0453 |

FOREIGN PATENT DOCUMENTS

| | | |
|---|---|---|
| CN | 101690352 A | 3/2010 |
| CN | 101690355 A | 3/2010 |
| CN | 102164403 A | 8/2011 |
| CN | 102523631 A | 6/2012 |
| CN | 102547871 A | 7/2012 |
| EP | 2434815 A2 | 3/2012 |
| JP | 2010-279042 A | 12/2010 |
| JP | 2013-34165 A | 2/2013 |
| JP | 2013-98990 A | 5/2013 |
| KR | 20130011883 * | 2/2013 ............ H04W 56/00 |
| WO | WO 2010/035100 A1 | 4/2010 |
| WO | 2011/080533 A1 | 7/2011 |
| WO | 2011/121374 A1 | 10/2011 |
| WO | 2011-130630 A1 | 10/2011 |
| WO | WO 2011/156638 A2 | 12/2011 |
| WO | 2012/068224 A1 | 5/2012 |
| WO | 2013/002688 A1 | 1/2013 |
| WO | WO-2013106738 A1 | 7/2013 |

OTHER PUBLICATIONS

International Search Report dated Aug. 26, 2014 in PCT/JP14/065743 Filed Jun. 13, 2014.
Intel Corporation, "Discussion on Scenarios for Studies on D2D Proximity Services", 3GPP TSG RAN WG1 Meeting #72bis R1-130923 Chicago, USA, Apr. 15-19, 2013.
Office Action dated May 8, 2018 in corresponding Japanese Patent Application No. 2016-095909, 6 pages.
NTT Docomo, "Deployment Scenarios and Requirements for D2D Proximity Services", 3GPP TSG RAN WG1 Meeting #72bis, R1-131430, Apr. 15-19, 2013, pp. 1-7.
Ericsson, ST-Ericsson, "D2D for LTE Proximity Services: Overview", 3GPP TSG-RAN WG1 #73, R1-132028, May 20-24, 2013, pp. 1-6.
Extended European Search Report dated Dec. 19, 2018 issued in corresponding European Application No. 18183458.1, 7 pages.
Synchronization Procedures for D2D Discovery and Communication, Ericsson, ST-Ericsson, R1-132029, 3GPP TSG-RAN WG1 #73, May 20-24, 2013, 6 pages.
Device Discovery Outside and Partial Network Coverage, LG Electronics, R1-132249, 3GPP TSG RAN WG1 Meeting # 73, May 20-24, 2013, 4 pages.
Extended European Search Report dated Mar. 10, 2017 in Patent Application No. 14831837.1.
Alcatel-Lucent et al., "Device Discovery for D2D Proximity Services", 3GPP TSG-RAN1 Meeting #72bis Chicago, USA, R1-130954, XP50696952, Apr. 15-19, 2013, 4 pages.
ETRI, "Discovery Signal Design Based on Legacy Signals", 3GPP TSG RAN WG1 Meeting #73, Fukuoka, Japan, R1-132559, XP50698276, May 20-24, 2013, 3 pages.
Japanese Office Action dated Mar. 8, 2016 in Patent Application No. 2015-529446 (with English Translation).
Interdigital, "D2D Communication in LTE", 3GPP TSG•RAN WG1 Meeting #73, R1-132188, May 20-24, 2013, 7 pages.
Japanese Office Action dated Jul. 16, 2019 in Japanese Application No. 2018-165233.
Office Action and Search Report issued in Chinese Application 201480041517.3 dated Jul. 20, 2018.
Hu Guo-qiang, "Considerations about Synchronization of Mobile Communication Network", China Academic Journal Electronic Publishing House, pp. 59-62, 2012.

* cited by examiner

TERMINAL DEVICE AND INFORMATION PROCESSING APPARATUS

TECHNICAL FIELD

The present disclosure relates to a terminal device and an information processing apparatus.

BACKGROUND ART

Device-to-device communication (D2D communication) is a communication form in which a signal is directly transmitted between terminal devices, unlike a communication form in which a signal passes through a base station in cellular communication. Therefore, in the D2D communication, new use forms of terminal devices unlike the existing cellular communication are expected to appear. For example, various applications such as information sharing by data communication between near terminal devices or a group of near terminal devices, information distribution from installed terminal devices, and autonomous communication between devices called Machine to Machine (M2M) can be considered.

With regard to the significant increase in data traffic with the recent increase of smartphones, the D2D communication can also be considered to be utilized in off-loading of data. In recent years, for example, demands for transmission and reception of streaming data of moving images have rapidly increased. However, since moving images generally have large data amounts, the moving images have a problem in that they consume many resources in a Radio Access Network (RAN). Accordingly, when terminal devices are in a state suitable for the D2D communication such as a case in which a distance between terminal devices is small, resource consumption and process loads in the RAN can be suppressed by off-loading moving image data in the D2D communication. Thus, the D2D communication is useful for both communication providers and users. Therefore, at present, the D2D communication is recognized and noticed as one of the important technical areas necessary for Long Term Evolution (LTE) of the 3rd Generation Partnership Project (3GPP) standardization commission as well.

In the related art, as disclosed in the following patent literature, communication schemes such as Bluetooth (registered trademark) and WiFi (registered trademark) have been adopted in the D2D communication and combinations of such communication schemes and communication schemes of cellular communication such as Wideband Code Division Multiple Access (WCDMA) (registered trademark) and LTE have been combined as an example.

CITATION LIST

Patent Literature

Patent Literature 1: JP 2010-279042A

SUMMARY OF INVENTION

Technical Problem

Unlike the case of above Patent Literature 1, when the same communication scheme as the communication scheme of cellular communication (for example, LTE) is adopted in the D2D communication, a terminal device for performing the D2D communication needs to acquire synchronization with another device of the D2D communication, in the same way as acquiring synchronization with the base station in the cellular communication. However, when the synchronization method for the cellular communication and the synchronization method for the D2D communication are prepared separately, the terminal device for performing the D2D communication differently uses both of the synchronization method for the cellular communication and the synchronization method for the D2D communication, and thus the operation of the terminal device can become complicated.

Thus, it is desirable to provide a scheme that simplifies the operation of the terminal device for performing the D2D communication in which the same communication scheme as the communication scheme of the cellular communication is adopted.

Solution to Problem

According to the present disclosure, there is provided a terminal device including: a detection unit configured to detect a synchronization signal for wireless communication with a base station; and a control unit configured to control transmission of a synchronization signal for inter-device communication. A radio frame used in the wireless communication with the base station and a radio frame used in the inter-device communication have a same frame structure. A timing of the synchronization signal for the inter-device communication in the same frame structure is same as a timing of the synchronization signal for the wireless communication with the base station in the same frame structure.

According to the present disclosure, there is provided an information processing apparatus including: one or more processors; and a memory configured to store a program executed by the one or more processors. The program is a program for executing detecting a synchronization signal for wireless communication with a base station, and controlling transmission of a synchronization signal for inter-device communication. A radio frame used in the wireless communication with the base station and a radio frame used in the inter-device communication have a same frame structure. A timing of the synchronization signal for the inter-device communication in the same frame structure is same as a timing of the synchronization signal for the wireless communication with the base station in the same frame structure.

According to the present disclosure, there is provided a terminal device including: a detection unit configured to detect a synchronization signal for inter-device communication transmitted by another terminal device; and a control unit configured to acquire synchronization for the inter-device communication, on the basis of a detection result of the synchronization signal. A radio frame used in wireless communication with a base station and a radio frame used in the inter-device communication have a same frame structure. A timing of the synchronization signal for the inter-device communication in the same frame structure is same as a timing of the synchronization signal for the wireless communication with the base station in the same frame structure.

Advantageous Effects of Invention

As described above, according to the present disclosure, it is possible to simplify the operation of the terminal device for performing the D2D communication in which the same communication scheme as the communication scheme of the cellular communication is adopted.

DESCRIPTION OF EMBODIMENTS

Figure 1:
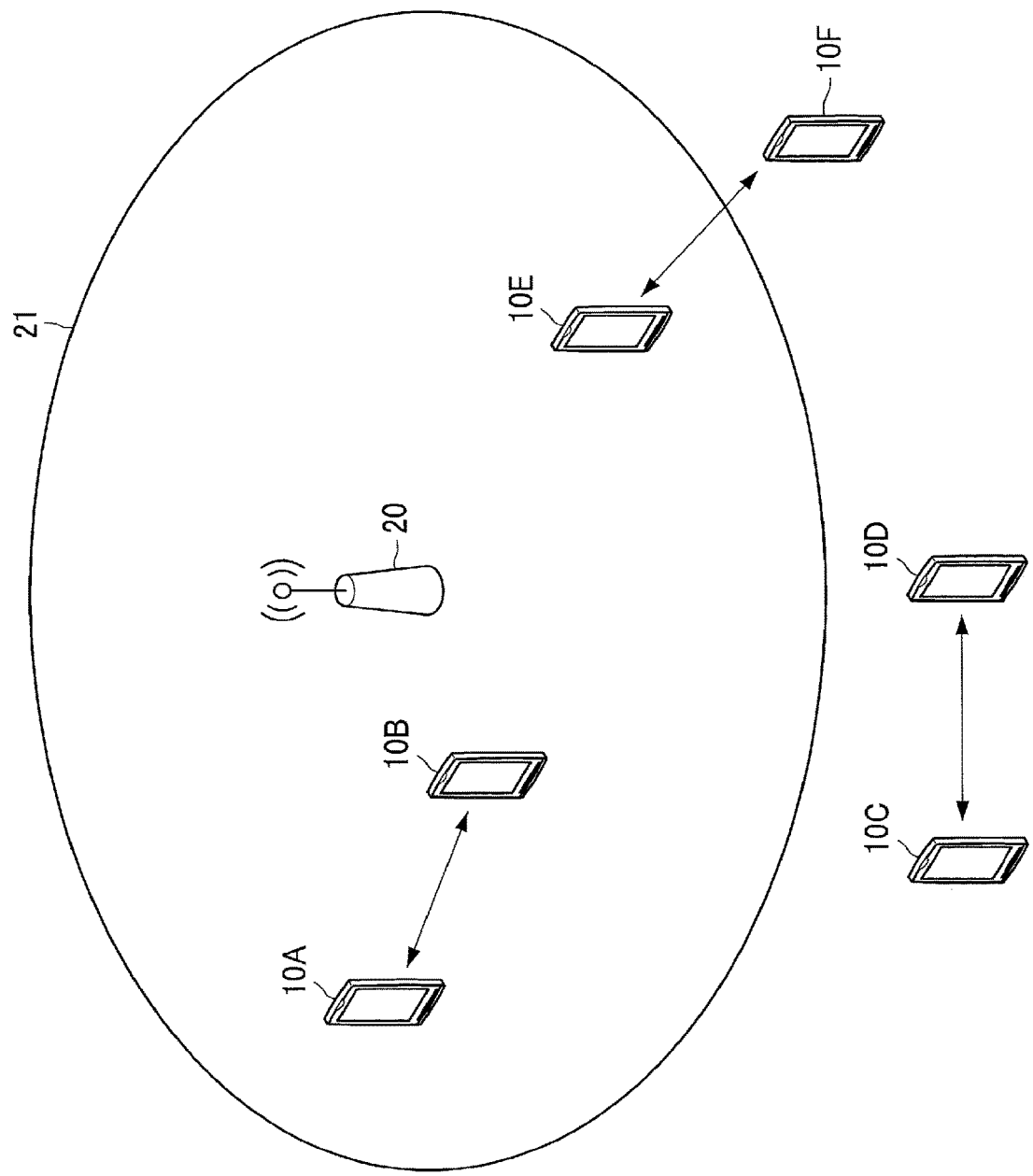
FIG. 1 is a first explanatory diagram for describing a specific example of a use case of D2D communication.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in the present specification and drawings, a plurality of structural elements that have substantially the same function and structure are sometimes distinguished by adding different alphabets after a same reference numeral. For example, a plurality of elements having substantially the same function and structure are distinguished as in terminal devices 100A, 100B, and 100C as necessary. However, when a plurality of structural elements that have substantially the same function and structure are needless to be distinguished from each other, only a same reference sign is assigned. For example, when it is needless to distinguish the terminal devices 100A, 100B, and 100C particularly, they are referred to as terminal device 100 simply.

Note that description will be made in the following order.
1. Introduction
2. Schematic Configuration of Communication System According to Present Embodiment
3. Configuration of Terminal Device
4. Configuration of Base Station
5. Flow of Process
6. Exemplary Variant
    6.1. First Exemplary Variant
    6.2. Second Exemplary Variant
    6.3. Third Exemplary Variant
7. Application Example
8. Conclusion

1. INTRODUCTION

First, with reference to FIGS. 1 to 3, a use case of the D2D communication, a flow up to the D2D communication, a radio resource for the D2D communication, and a synchronization signal will be described.

(Use Case of D2D Communication)

In a standard LTE system, an evolved node B (eNB) and a UE communicate wirelessly with each other, but UEs do not communicate wirelessly with each other. However, for the purpose of public safety (for example, for the purpose of collision prevention and others) or data offloading, a method in which UEs wirelessly and directly communicate with each other is called for.

The use case of the D2D communication is discussed in service and systems aspects (SA) 1 of 3GPP and others, and is described in TR 22.803. Note that the use case is disclosed in TR 22.803, but specific configuration means is not disclosed. In the following, a specific example of the use case will be described with reference to FIGS. 1 and 2.

FIG. 1 is a first explanatory diagram for describing a specific example of the use case of the D2D communication. Referring to FIG. 1, a plurality of UEs 10 and an eNB 20 are illustrated. As the first use case, for example, a UE 10A and a UE 10B positioned in a cell 21 formed by the eNB 20 (i.e., coverage of the eNB 20) perform the D2D communication. This D2D communication is referred to as D2D communication in the coverage. As the second use case, for example, a UE 10C and a UE 10D positioned outside the cell 21 perform the D2D communication. This D2D communication is referred to as D2D communication outside the coverage. As the third use case, for example, a UE 10E positioned inside the cell 21 and a UE 10F positioned outside the cell 21 perform the D2D communication. This D2D communication is referred to as D2D communication of partial coverage. From the view point of public safety, the D2D communication outside the coverage and the D2D communication of the partial coverage are also important.

Figure 2:
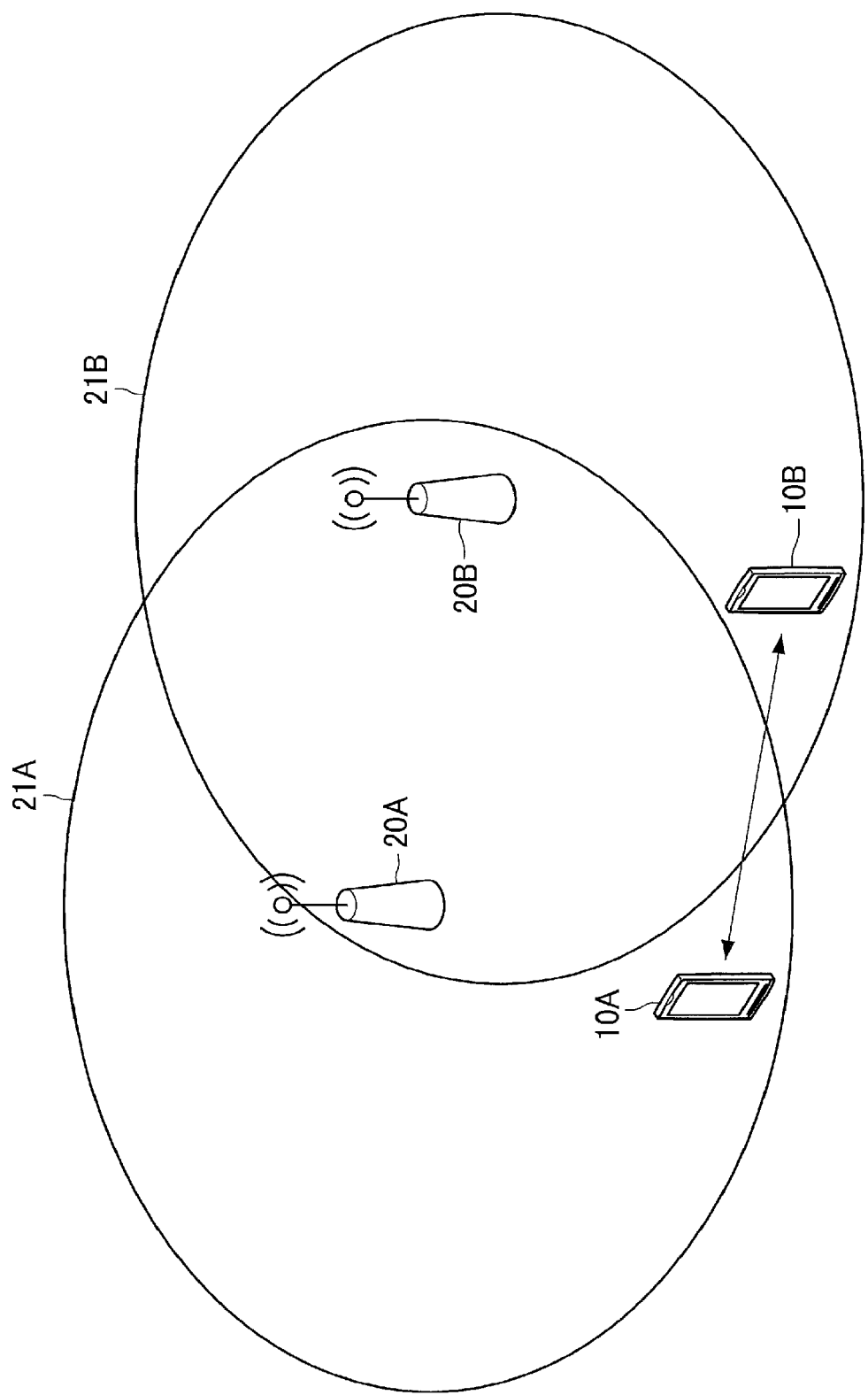
FIG. 2 is a second explanatory diagram for describing a specific example of a use case of D2D communication.

FIG. 2 is a second explanatory diagram for describing a specific example of the use case of the D2D communication. Referring to FIG. 2, the UE 10 and the eNB 20 and the eNB 20A and the eNB 20B are illustrated. In this example, the eNB 20A is operated by a first mobile network operator (MNO), and the eNB 20B is operated by a second MNO.

Then, the UE 10A positioned inside the cell 21A formed by the eNB 20A and the UE 10B positioned inside the cell 21B formed by the eNB 20B perform the D2D communication. From the view point of public safety, this D2D communication is also important.

(Flow Up to D2D Communication)

For example, synchronization, discovery of another UE, and establishment of connection are performed in order, and thereafter the D2D communication is performed. In the following, consideration will be described with respect to each step of the synchronization, the discovery, and the connection establishment.

Synchronization

When two UEs are positioned in the coverage of an eNB (i.e., the cell formed by the eNB), the above two UEs are capable of synchronizing with each other to a certain extent, by acquiring synchronization with the eNB using a downlink signal from the above eNB.

On the other hand, when at least one of two UEs that are about to perform the D2D communication is positioned outside the coverage of the eNB (i.e., the cell formed by the eNB), the at least one of the above two UEs needs to transmit a synchronization signal for synchronization in the D2D communication.

Discovery of Another UE

The discovery of another UE is performed by transmission and reception of a discovery signal, for example. More specifically, for example, one UE of the two UEs transmits a discovery signal, and the other the UE of the two UEs receives the discovery signal in order to attempt communication with the above one UE.

It is desirable that the discovery signal is transmitted at a predetermined timing in the time direction. Thereby, the timing at which the UE of the reception side attempts reception of the above discovery signal is limited. Note that, as a premise, the two UEs, which are about to perform the D2D communication, acquire synchronization in advance before receiving the discovery signal.

When the two UEs, which are about to perform the D2D communication, are positioned in the coverage of the eNB, the discovery signal can be transmitted by one UE in response to the control by the eNB. On the other hand, when the two UEs, which are about to perform the D2D communication, are positioned outside the coverage of the eNB, it is desirable that the discovery signal is transmitted by a contention based method. From the view point of unified design, it is desirable that the contention based method is adopted for both of the D2D communication inside the coverage and the D2D communication outside the coverage, but different methods may be adopted for the D2D communication inside the coverage and the D2D communication outside the coverage, respectively.

Connection Establishment

Two UEs, which are about to perform the D2D communication, can establish connection as in the following, for example. First, a first UE transmits a discovery signal, and a second UE receives the discovery signal. Thereafter, the second UE transmits to the first UE a request message for requesting establishment of connection. Then, the first UE transmits to the second UE a completion message indicating that the establishment of connection is completed, in response to the above request message.

(Radio Resource for D2D Communication)

The D2D communication inside the coverage is not allowed to interfere with the communication between the UE and the eNB. Hence, in the D2D communication inside the coverage, radio resources that are not used in the communication between the UE and the eNB are used, for example. The radio resource may be resource blocks (12 subcarriers×7 orthogonal frequency division multiplexing (OFDM) symbols), or may be subframes (1 ms). When the above radio resource is a subframe, a specific subframe is released as the radio resource for the D2D communication, and the eNB notifies the UE in advance.

On the other hand, it is desirable that the interference during the D2D communication is considered, with respect to the D2D communication outside the coverage. For example, a method in which a signal is basically transmitted based on contention and when collision of signals occurs the signal is retransmitted as necessary can be adopted.

(Synchronization Signal)

In LTE, a primary synchronization signal (PSS) and a secondary synchronization signal (SSS) are used as the synchronization signal. The PSS and the SSS are transmitted at predetermined timings in the frame structure of a radio frame. In the following, a specific example of the timings of the PSS and the SSS in FDD (Frequency Division Duplex) will be described with reference to FIG. 3.

Figure 3:
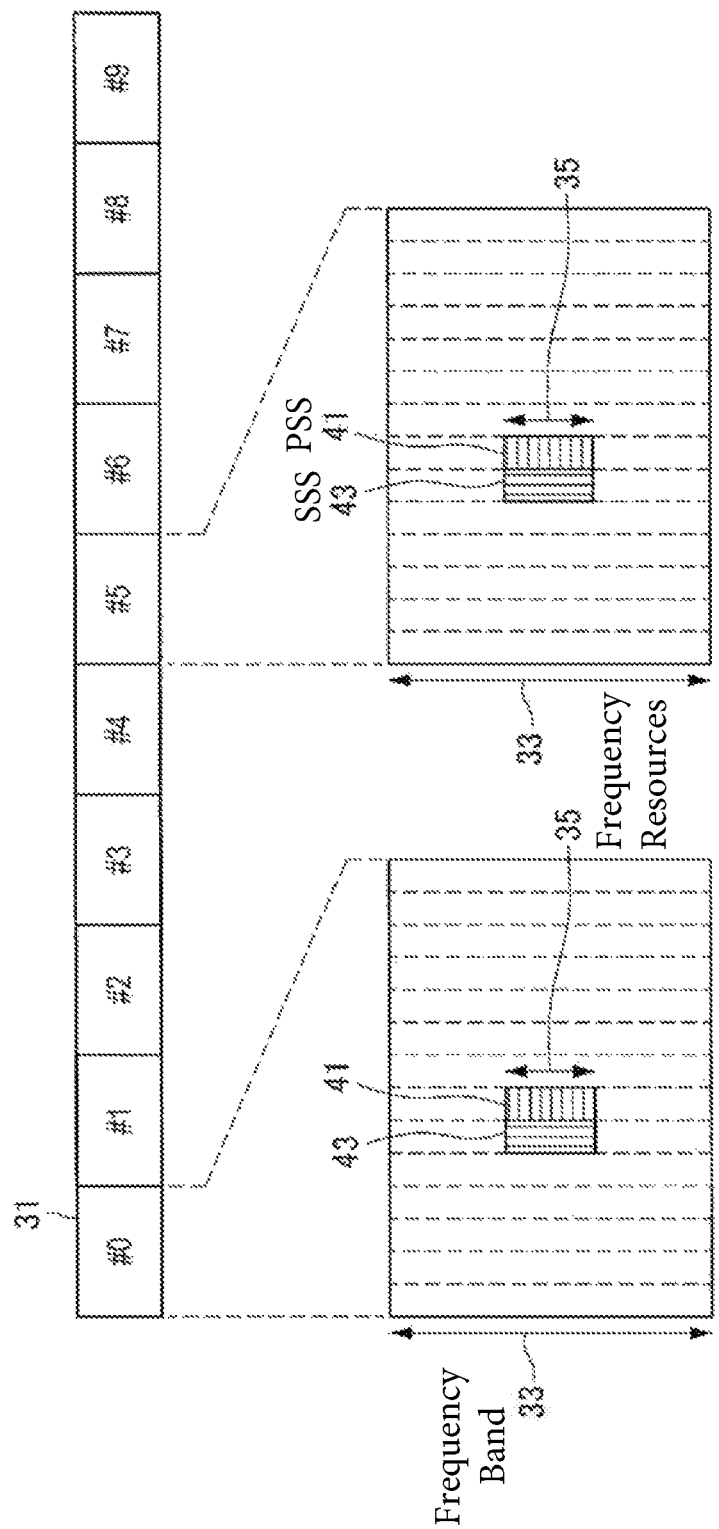
FIG. 3 is an explanatory diagram for describing a specific example of timings of PSS and SSS.

FIG. 3 is an explanatory diagram for describing a specific example of the timings of the PSS and the SSS. Referring to FIG. 3, ten subframes 31 included in a radio frame are illustrated. In FDD, a PSS 41 and a SSS 43 are transmitted in each of subframe #0 and subframe #5 (i.e., the first subframe and the sixth subframe) among the ten subframes 31. More specifically, the SSS 43 is transmitted in the sixth OFDM symbol among fourteen OFDM symbols included in each of these subframes, and the PSS 41 is transmitted in the seventh OFDM symbol among the above fourteen OFDM symbols. Note that the PSS 41 and the SSS 43 are transmitted using a predetermined number of frequency resources 35 (seventy two subcarriers) that are positioned at the center of the frequency band 33.

Although an example of FDD has been described in FIG. 3, the PSS and the SSS are transmitted at predetermined timings in TDD as well. Specifically, the PSS is transmitted in the third OFDM symbol of each of subframe #1 (the second subframe) and subframe #6 (the seventh subframe). Also, the SSS is transmitted in the fourteenth OFDM symbol of each of subframe #0 (the first subframe) and subframe #5 (the sixth subframe).

The UE obtains the knowledge of timings of each subframe, by detecting the PSS. Also, the UE obtains the knowledge of which subframe is subframe #0, by detecting the SSS.

Further, the UE identifies the cell group that the cell formed by the eNB that transmits the PSS belongs to, from among three cell groups, on the basis of the sequence of the PSS. Also, the UE identifies the cell formed by the eNB that transmits the SSS, from among 168 cell candidates that belong to one cell group, on the basis of the sequence of the SSS. That is, the UE identifies the cell formed by the eNB that transmits the PSS and the SSS, from among 504 cell candidates, on the basis of the sequence of the PSS and the sequence of the SSS.

2. SCHEMATIC CONFIGURATION OF COMMUNICATION SYSTEM ACCORDING TO PRESENT EMBODIMENT

Figure 4:
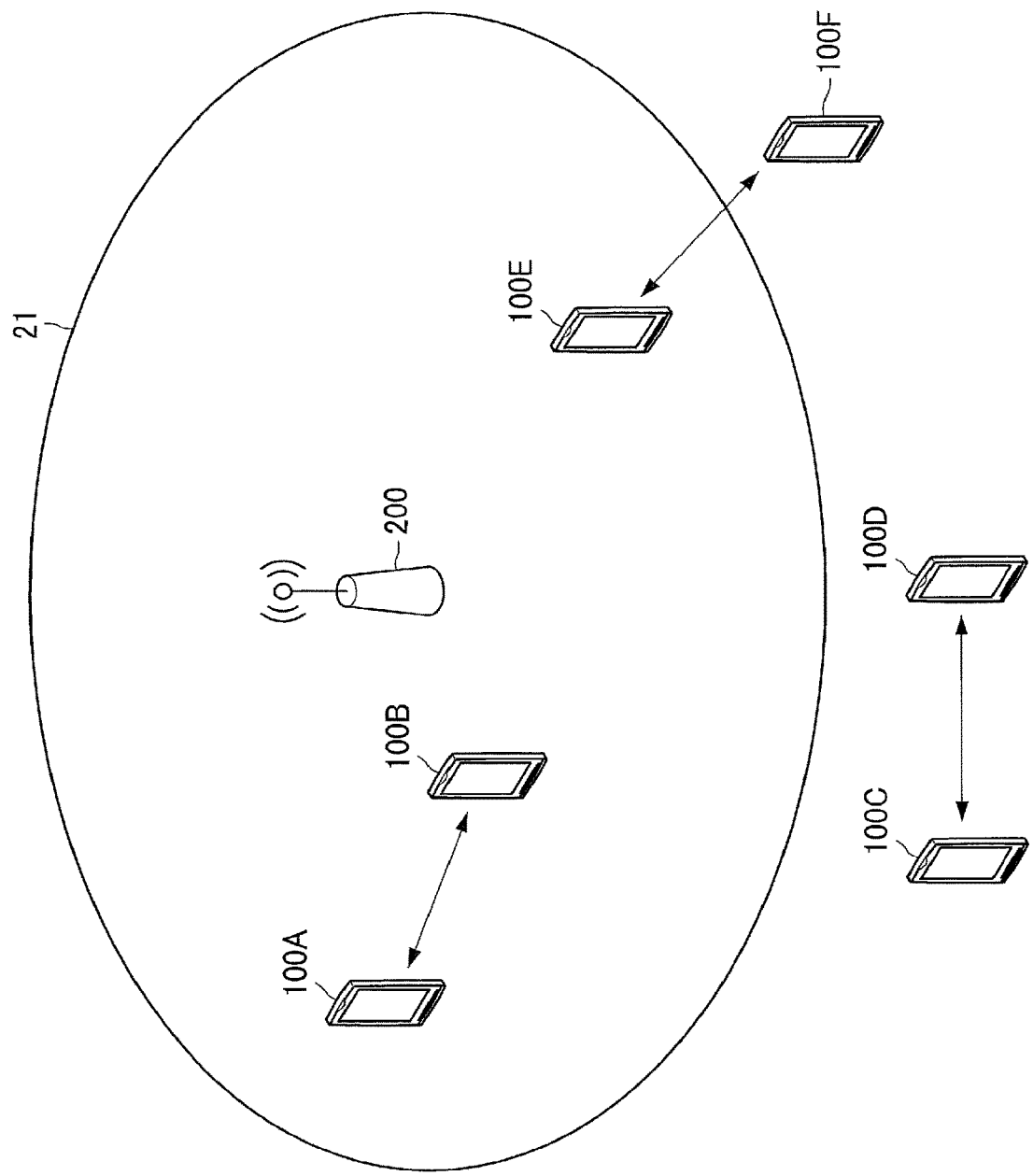
FIG. 4 is an explanatory diagram illustrating an example of a schematic configuration of a communication system according to an embodiment of the present disclosure.

Next, with reference to FIG. 4, the schematic configuration of the communication system 1 according to the embodiment of the present disclosure will be described. FIG. 4 is an explanatory diagram illustrating an example of the schematic configuration of the communication system 1 according to the present embodiment. Referring to FIG. 4, the communication system 1 includes a plurality of terminal devices 100 and a base station 200. The communication system 1 is a system according to LTE, LTE-Advanced, or equivalent communication schemes, for example.

(Terminal Device 100)

The terminal device 100 communicates wirelessly with the base station 200, when positioned in the cell 21 formed by the base station 200. For example, the terminal device 100 detects the synchronization signal (for example, the PSS and the SSS) for the wireless communication with the base station 200, and acquires synchronization for the wireless communication. Thereafter, the terminal device 100 performs a random access procedure and a radio resource control (RRC) connection establishment procedure, or the like, with the base station 200. Then, the terminal device 100 communicates wirelessly with the base station 200.

In particular, in the present embodiment, the terminal device 100 performs the D2D communication with another terminal device 100. For example, the terminal device 100A and the terminal device 100B are positioned inside the cell 21, and therefore perform the D2D communication in the coverage. Also, for example, the terminal device 100C and the terminal device 100D are positioned outside the cell 21, and therefore perform the D2D communication outside the coverage. Also, for example, the terminal device 100E is positioned inside the cell 21, and the terminal device 100F is positioned outside the cell 21, and therefore the terminal device 100E and the terminal device 100F perform the D2D communication of the partial coverage.

Note that, for example, the terminal device 100 performs the wireless communication in OFDM in the downlink direction from the base station 200 to the terminal device 100, and communicates wirelessly in single carrier frequency division multiple access (SC-FDMA) in the uplink direction from the terminal device 100 to the base station 200. Also, for example, the terminal device 100 performs the D2D communication in OFDM.

(Base Station 200)

The base station 200 communicates wirelessly with the terminal device 100 that are positioned in the cell 21 formed by the base station 200. For example, the base station 200 transmits a synchronization signal (for example, the PSS and the SSS) for the wireless communication with the base station 200. Also, the base station 200 performs the random access procedure, the RRC connection establishment procedure, and the like, with the UE 100 for which the synchronization is acquired by the detection of the above synchronization signal. Then, the base station 200 communicates wirelessly with the terminal device 100.

Figure 5:
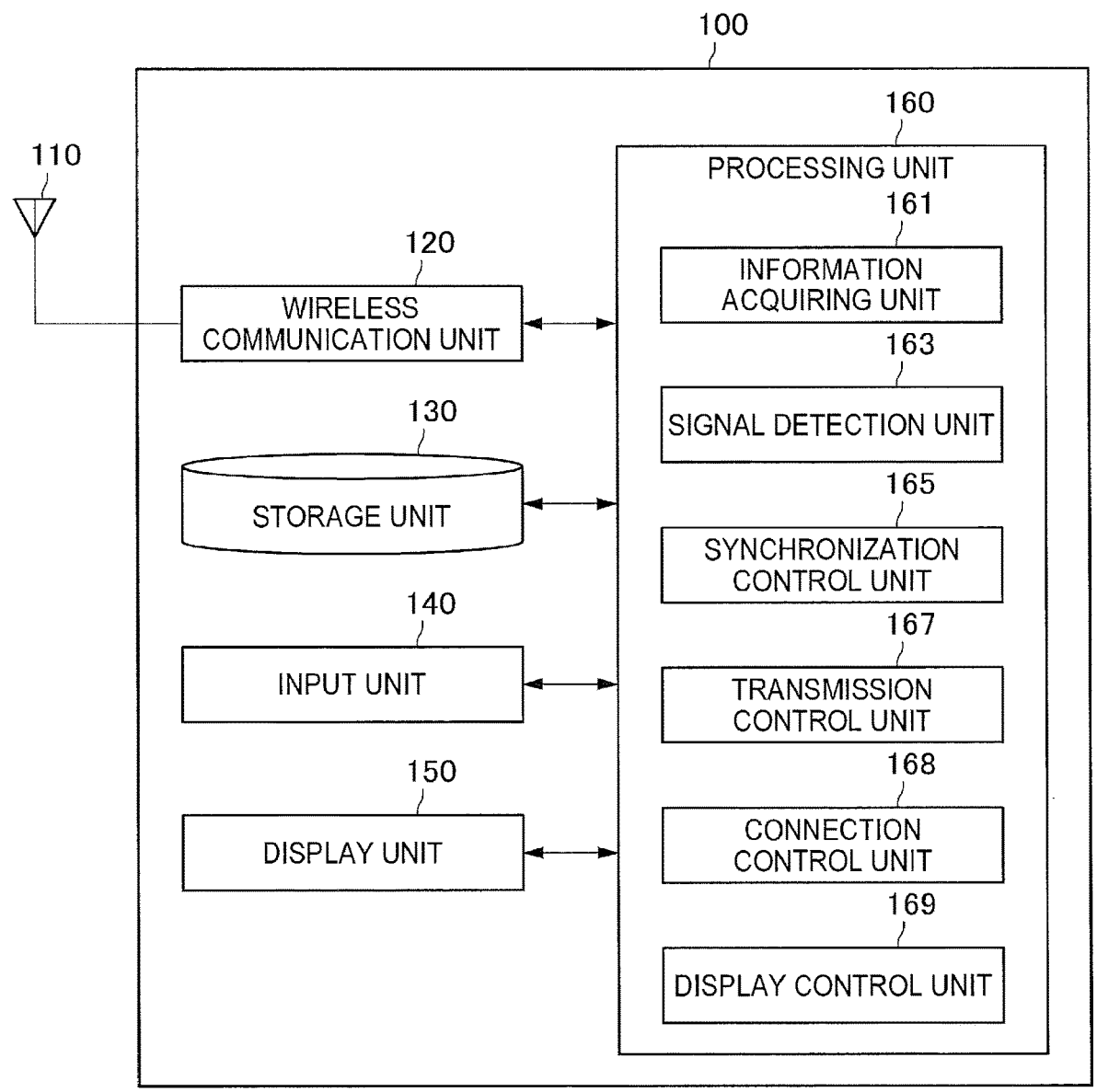
FIG. 5 is a block diagram illustrating an example of a configuration of a terminal device according to an embodiment.

Next, with reference to FIGS. 5 to 9, an example of the configuration of the terminal device 100 according to the present embodiment will be described. FIG. 5 is a block diagram illustrating an example of the configuration of the terminal device 100 according to the present embodiment. Referring to FIG. 5, the terminal device 100 includes an antenna unit 110, a wireless communication unit 120, a storage unit 130, an input unit 140, a display unit 150, and a processing unit 160.

(Antenna Unit 110)

The antenna unit 110 receives a radio signal, and outputs the received radio signal to the wireless communication unit 120. Also, the antenna unit 110 transmits a transmission signal output by the wireless communication unit 120.

(Wireless Communication Unit 120)

The wireless communication unit 120 communicates wirelessly with the base station 200, when the terminal device 100 is positioned in the cell 21 formed by the base station 200. Also, the wireless communication unit 120 performs the wireless communication (the D2D communication) with another terminal device 100.

(Storage Unit 130)

The storage unit 130 stores programs and data for the operation of the terminal device 100.

(Input Unit 140)

The input unit 140 accepts an input by the user of the terminal device 100. Then, the input unit 140 provides the processing unit 160 with the input result.

(Display Unit 150)

The display unit 150 displays an output screen image (i.e., the output image) from the terminal device 100. For example, the display unit 150 displays the output screen image, in response to the control by the processing unit 160 (the display control unit 169).

(Processing Unit 160)

The processing unit 160 provides various functions of the terminal device 100. The processing unit 160 includes an information acquiring unit 161, a signal detection unit 163, a synchronization control unit 165, a transmission control unit 167, a connection control unit 168, and a display control unit 169.

(Information Acquiring Unit 161)

The information acquiring unit 161 acquires the information necessary for the process by the processing unit 160. For example, the information acquiring unit 161 acquires information from another device via the wireless communication unit 120. Also, for example, the information acquiring unit 161 acquires the information stored in the storage unit 130.

(Signal Detection Unit 163)

Detection of Synchronization Signal

The signal detection unit 163 detects the synchronization signal for the wireless communication with the base station 200. For example, the base station 200 transmits a synchronization signal (for example, the PSS and the SSS) for the wireless communication with the base station 200, at a predetermined timing in the frame structure of the radio frame. Then, the wireless communication unit 120 receives the synchronization signal, and the signal detection unit 163 detects the synchronization signal. As one example, the signal detection unit 163 detects the synchronization signal, by checking whether the sequence of the reception signal matches the sequence of the synchronization signal candidate.

Also, the signal detection unit 163 detects the synchronization signal for the D2D communication transmitted by another terminal device 100. For example, when another terminal device 100 transmits a synchronization signal for the D2D communication, the wireless communication unit 120 receives the synchronization signal, and the signal detection unit 163 detects the synchronization signal. As one example, the signal detection unit 163 detects the synchronization signal, by checking whether the sequence of the reception signal matches the sequence of the synchronization signal candidate.

Detection of Discovery Signal

Also, for example, the signal detection unit 163 detects the discovery signal transmitted by another terminal device 100. The discovery signal is a signal with which another terminal device 100 can be discovered, for the purpose of the D2D communication. Specifically, for example, the above discovery signal is transmitted at a predetermined timing in the radio frame, and the signal detection unit 163 detects the above discovery signal at the predetermined timing.

(Synchronization Control Unit 165)
Synchronization for Wireless Communication with Base Station The synchronization control unit 165 acquires synchronization for the wireless communication, on the basis of the detection result of the synchronization signal for the wireless communication with the base station 200.

For example, the synchronization control unit 165 acquires the timing synchronization in the symbol level, on the basis of the detection result of the synchronization signal for the wireless communication with the base station 200. As one example, the synchronization control unit 165 acquires the timing synchronization in the symbol level, by deciding a window (for example, a fast fourier transform (FFT) window) for detecting each OFDM symbol.

Also, for example, the synchronization control unit 165 acquires the timing synchronization in the subframe level, on the basis of the detection result of the synchronization signal for the wireless communication with the base station 200. As one example, the synchronization control unit 165 acquires the timing synchronization in the subframe level, by obtaining the knowledge of the timing of each subframe by the detection of the PSS.

Also, for example, the synchronization control unit 165 acquires the timing synchronization in the radio frame level, on the basis of the detection result of the synchronization signal for the wireless communication with the base station 200. As one example, the synchronization control unit 165 acquires the timing synchronization in the radio frame level, by obtaining the knowledge of which subframe is subframe #0, by the detection of the SSS.

Synchronization for D2D Communication

The synchronization control unit 165 acquires synchronization for the above D2D communication, on the basis of the detection result of the synchronization signal for the D2D communication transmitted by another terminal device 100.

For example, the synchronization control unit 165 acquires the timing synchronization in the symbol level, in the same way as the acquisition of the synchronization for the wireless communication with the base station 200. Also, for example, the synchronization control unit 165 acquires the timing synchronization in the subframe level, in the same way as the acquisition of the synchronization for the wireless communication with the base station 200. Also, for example, the synchronization control unit 165 acquires the timing synchronization in the radio frame level, in the same way as the acquisition of the synchronization for the wireless communication with the base station 200.

Also, for example, the synchronization control unit 165 differently uses the synchronization signal, depending on the position of the terminal device 100. That is, the synchronization control unit 165 acquires synchronization for the D2D communication, on the basis of the detection result of the synchronization signal for the above wireless communication with the base station 200, when the terminal device 100 is positioned in the cell 21 formed by the base station 200. On the other hand, the synchronization control unit 165 acquires synchronization for the D2D communication, on the basis of the detection result of the synchronization signal for the D2D communication transmitted by another terminal device 100, when the terminal device 100 is not positioned in the above cell 21. Thereby, in the case of the D2D communication inside the coverage, the terminal device 100 is needless to transmit the synchronization signal. As a result, for example, the interference in the cell 21 is reduced, and the overhead due to the synchronization signal can also be reduced. Also, the terminal device 100 can acquire synchronization for the D2D communication, even when positioned outside the cell 21.

(Transmission Control Unit 167)
Transmission Control of Synchronization Signal

The transmission control unit 167 controls the transmission of the synchronization signal for the D2D communication. That is, in response to the control by the transmission control unit 167, the synchronization signal for the D2D communication is transmitted by the terminal device 100. As one example, controlling of the transmission of the synchronization signal for the D2D communication is equal to inserting the synchronization signal for the D2D communication into a series of transmission signals.

Frame Structure

In particular, in the present embodiment, the radio frame used in the wireless communication with the base station 200 and the radio frame used in the D2D communication have a same frame structure. In the following, with respect to this point, a specific example will be described with reference to FIG. 6.

Figure 6:
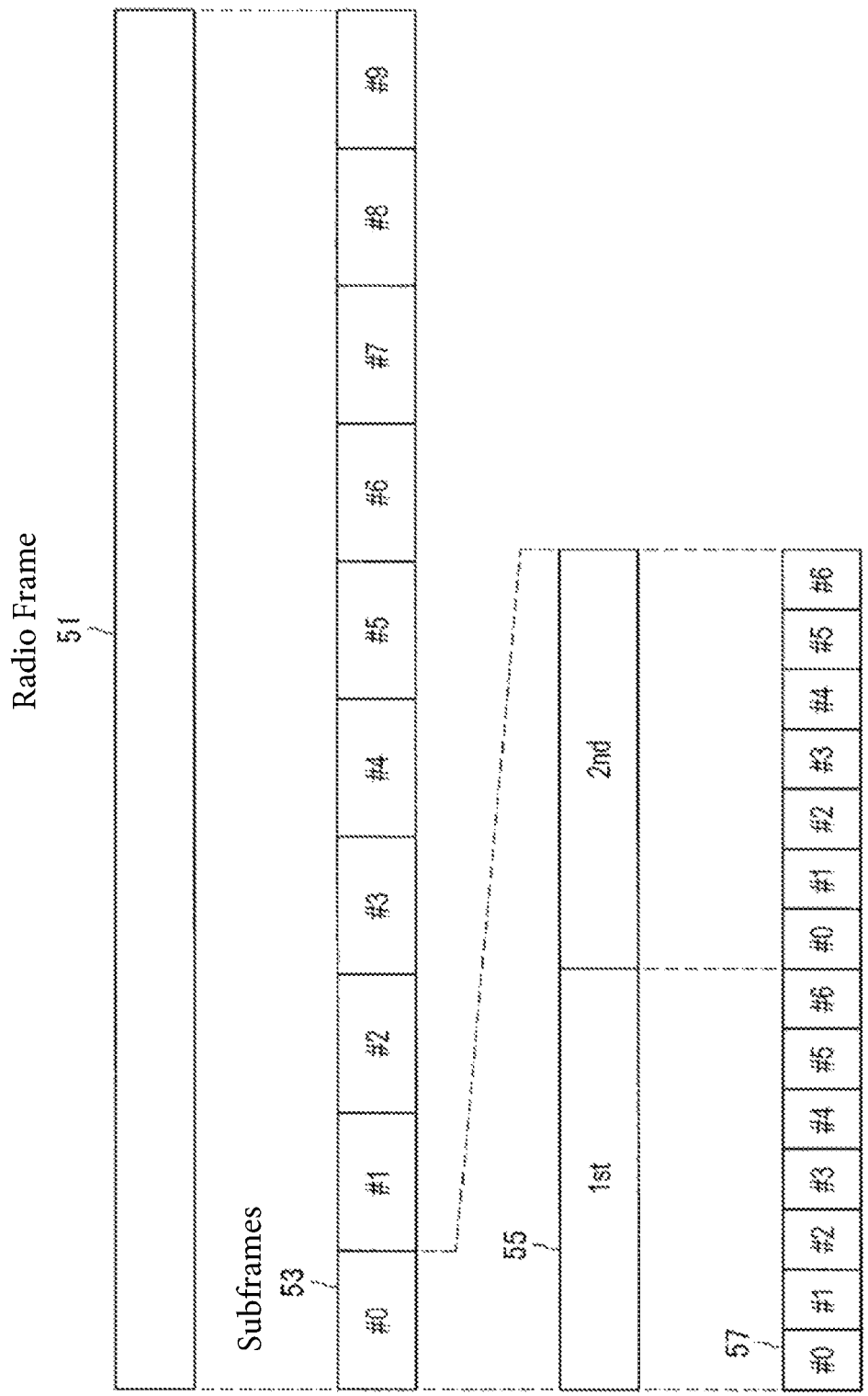
FIG. 6 is an explanatory diagram for describing an example of a structure of a radio frame used in D2D communication in an embodiment.

FIG. 6 is an explanatory diagram for describing an example of the structure of the radio frame used in the D2D communication in the present embodiment. Referring to FIG. 6, the radio frame 51 used in the D2D communication in the present embodiment is illustrated. The radio frame 51 includes ten subframes 53 (subframes 53 of #0 to #9). Further, each subframe 53 includes two slots 55 (the first slot 55 and the second slot 55). Then, each slot includes seven symbols 57 (symbols 57 of #0 to #6). These symbols 57 are OFDM symbols, for example. As described above, the structure of the radio frame used in the D2D communication in the present embodiment is same as the structure of the radio frame used in the wireless communication with the base station.

Synchronization Signal for D2D Communication

For example, the synchronization signal for the D2D communication has the same configuration as the synchronization signal for the wireless communication with the base station 200.

More specifically, for example, the synchronization signal for the D2D communication is the PSS and the SSS. Then, for example, the PSS which is the synchronization signal for the wireless communication with the base station and the PSS which is the synchronization signal for the D2D communication include a sequence of the same length. Also, the SSS which is the synchronization signal for the wireless communication with the base station and the SSS which is the synchronization signal for the D2D communication include a sequence of the same length.

Timing of Synchronization Signal

Further, in particular in the present embodiment, the timing of the synchronization signal for the D2D communication in the above same frame structure is same as the timing of the synchronization signal for the wireless communication with the base station 200 in the above same frame structure. That is, the transmission control unit 167 controls the transmission of the above synchronization signal for the D2D communication, in such a manner that the timing of the synchronization signal for the D2D communication in the above same frame structure is same as the timing of the synchronization signal for the wireless communication with the base station 200 in the above same frame structure.

Also, for example, FDD is adopted for the wireless communication between the base station 200 and the terminal device 100, and the D2D communication between the terminal devices 100. In this case, the PSS for the D2D communication is transmitted at OFDM symbol #6 (i.e., the seventh OFDM symbol of the subframe) of the first slot of each of subframe #0 and subframe #5. Further, the SSS for the D2D communication is transmitted at OFDM symbol #5 (i.e., the sixth OFDM symbol of the subframe) of the first slot of each of subframe #0 and subframe #5.

Also, TDD may be adopted for the wireless communication between the base station 200 and the terminal device 100, and the D2D communication between the terminal devices 100. In this case, the PSS for the D2D communication may be transmitted at OFDM symbol #2 (i.e., the third OFDM symbol of the subframe) of the first slot of each of subframe #1 and subframe #6. Further, the SSS for the D2D communication may be transmitted at OFDM symbol #6 (i.e., the fourteenth OFDM symbol of the subframe) of the second slot of each of subframe #0 and subframe #5.

As described above, the transmission of the synchronization signal for the D2D communication is controlled. Thereby, the synchronization signal for the D2D communication transmitted by the terminal device 100 is capable of being received by another terminal device 100, with the same reception operation as the reception operation with respect to the synchronization signal transmitted by the base station 200 (the synchronization signal for the wireless communication with the base station 200). Hence, another terminal device 100 is needless to perform different operations, when receiving the synchronization signal for the wireless communication with the base station 200, and when receiving the synchronization signal for the D2D communication transmitted by the terminal device 100. That is, the operation of the terminal device for performing the D2D communication 100 in which the same communication scheme as the communication scheme of the cellular communication is adopted is simplified more.

Use Case in which Synchronization Signal is Transmitted by Terminal Device

First, for example, the synchronization signal for the D2D communication is transmitted by the terminal device 100, for the purpose of the D2D communication outside the coverage. That is, the transmission control unit 167 controls the transmission of the synchronization signal for the D2D communication, in such a manner that the synchronization signal for the D2D communication is transmitted when the terminal device 100 is positioned outside the cell 21 formed by the base station 100.

Second, for example, the synchronization signal for the D2D communication is transmitted by the terminal device 100, for the purpose of the D2D communication of the partial coverage. That is, the transmission control unit 167 controls the transmission of the synchronization signal for the D2D communication, in such a manner that the synchronization signal for the D2D communication is transmitted when the position condition of the terminal device 100 is satisfied. The above position condition will be described later.

Note that, for example, the synchronization signal for the D2D communication is not transmitted by the terminal device 100, for the purpose of the D2D communication inside the coverage. That is, the transmission control unit 167 controls the transmission of the synchronization signal for the D2D communication, in such a manner that the synchronization signal for the D2D communication is not transmitted, when the terminal device 100 is positioned in the cell 21 formed by the base station 100, and the above position condition is not satisfied. Note that the synchronization for the D2D communication in the coverage can be acquired on the basis of the detection result of the synchronization signal for the wireless communication with the base station 200.

Synchronization Signal for D2D Communication of Partial Coverage

For example, the transmission control unit 167 controls the timing to transmit the synchronization signal for the D2D communication, on the basis of the timing of the synchronization signal obtained by the detection of the synchronization signal for the wireless communication with the base station 200.

Position Condition

The transmission control unit 167 controls the timing to transmit the synchronization signal for the D2D communication, on the basis of the timing of the synchronization signal obtained by the detection of the synchronization signal for the wireless communication with the base station 200, when the position condition of the terminal device 100 is satisfied, for example.

For example, the above position condition includes that the terminal device 100 is positioned at a cell edge of the cell 21 formed by the base station 200. For example, whether or not the terminal device 100 is positioned at the cell edge of the cell 21 can be determined on the basis of a reference signal received power (RSRP) of the reference signal transmitted by the base station 200. As one example, the terminal device 100 can be determined to be positioned at the cell edge of the cell 21, when the above RSRP is a value within a predetermined range.

Further, for example, the above position condition includes that the terminal device 100 is not positioned at the vicinity of the adjacent cell of the cell 21. For example, whether or not the terminal device 100 is positioned at the vicinity of the adjacent cell of the cell 21 can be determined on the basis of the RSRP of the reference signal transmitted by another base station 200. As one example, when the RSRP of the reference signal transmitted by any other base stations 200 is less than a predetermined threshold value, it can be determined that the terminal device 100 is not positioned at the vicinity of the adjacent cell of the cell 21. In the following, with reference to FIG. 7, a specific example when the above position condition is satisfied and when the above position condition is not satisfied will be described.

Figure 7:
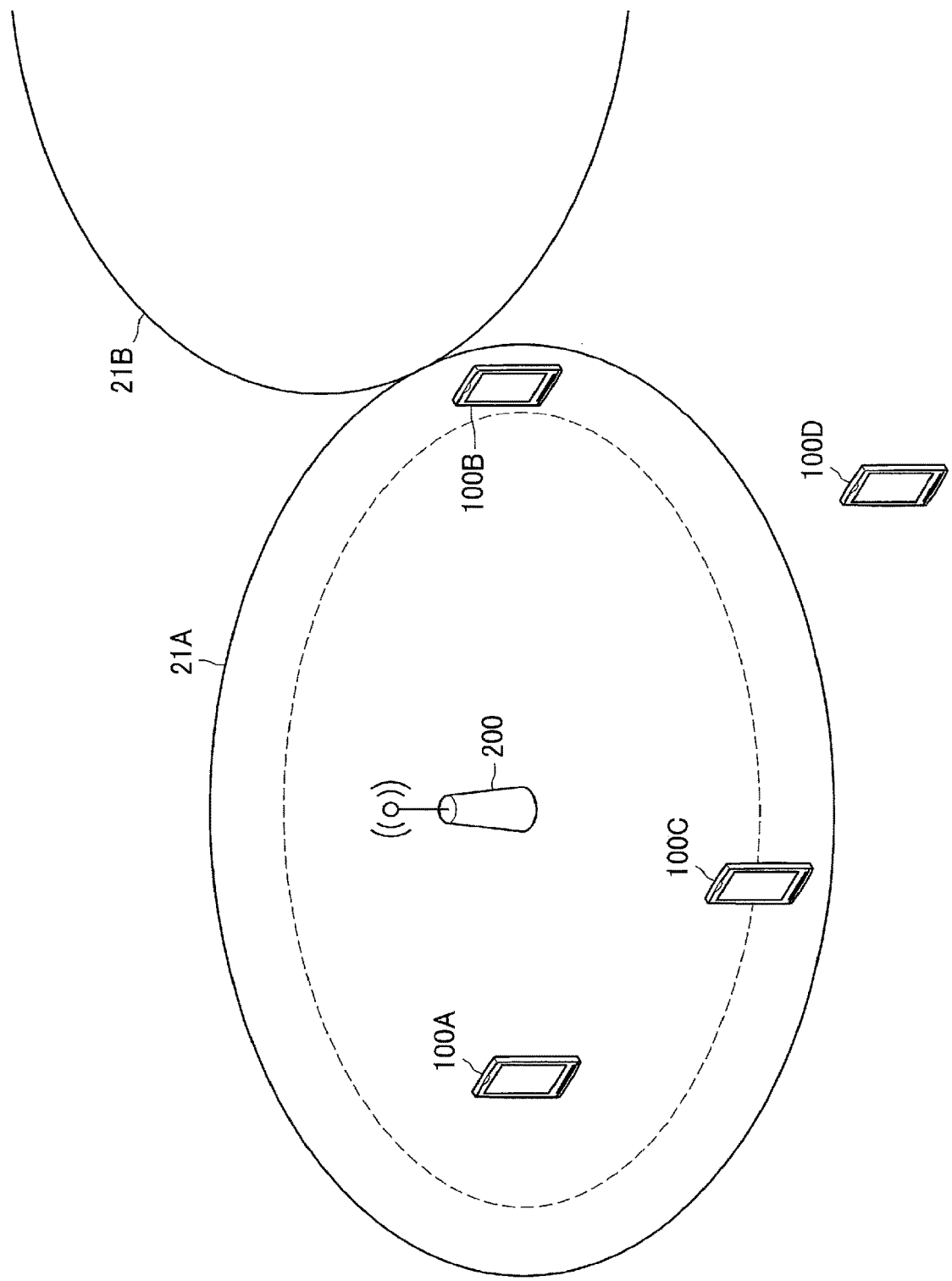
FIG. 7 is an explanatory diagram for describing an example when a position condition of a terminal device is satisfied and when the position condition is not satisfied.

FIG. 7 is an explanatory diagram for describing an example when the position condition of the terminal device 100 is satisfied and when the position condition is not satisfied. Referring to FIG. 7, a terminal device 100A, a terminal device 100B, a terminal device 100C and a terminal device 100D, and a base station 200 are illustrated. Also, a cell 21A formed by the base station 200, and an adjacent cell 21B are illustrated. First, the terminal device 100A is positioned at a region other than the cell edge of the cell 21A, and therefore the above position condition is not satisfied with respect to the terminal device 100A. Hence, the terminal device 100A does not transmit a synchronization signal for the D2D communication. Also, the terminal device 100B is positioned at the cell edge of the cell 21A and positioned at the vicinity of the adjacent cell 21B, and therefore the above position condition is not satisfied with respect to the terminal device 100B. Hence, the terminal device 100B does not transmit a synchronization signal for the D2D communication. Also, the terminal device 100C is positioned at the cell edge of the cell 21A but is not positioned at the vicinity of the adjacent cell 21B, and therefore the above position condition is satisfied with respect to the terminal device 100C. Hence, the terminal device 100C transmits a synchronization signal for the D2D communication. Note that the terminal device 100D is positioned outside the cell 21A, and therefore the above position condition is not satisfied with respect to the terminal device 100D. However, the terminal device 100D transmits a synchronization signal for the D2D communication, for the purpose of the D2D communication outside the coverage.

The control in the above position condition enables the terminal device 100 to transmit a synchronization signal for the D2D communication, for the purpose of the D2D communication of the partial coverage, for example.

Timing to Transmit Synchronization Signal for D2D Communication

As the first example, the transmission control unit 167 controls the timing to transmit the above synchronization signal for the above inter-device communication, in such a manner to set at the timing a predetermined time after the timing of the synchronization signal obtained by the detection of the synchronization signal for the wireless communication with the base station 200.

More specifically, for example, the above radio frame includes a plurality of subframes, and the above predetermined time is a time corresponding to a predetermined number of subframes. In the following, with respect to this point, a specific example will be described with reference to FIG. 8.

Figure 8:
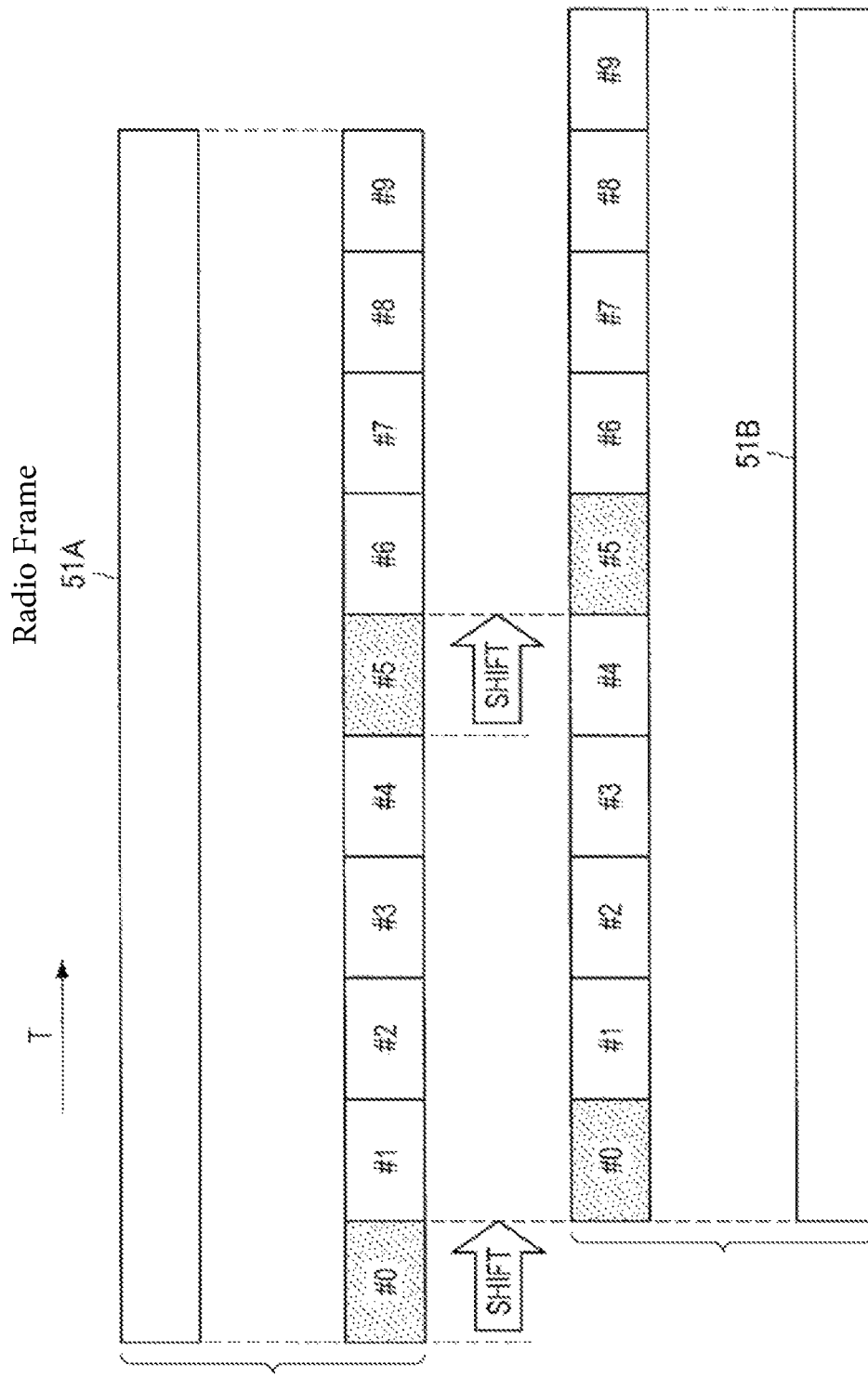
FIG. 8 is an explanatory diagram for describing a first example of a timing at which a terminal device transmits a synchronization signal for D2D communication in an embodiment.

FIG. 8 is an explanatory diagram for describing the first example of the timing at which the terminal device transmits the synchronization signal for the D2D communication in the present embodiment. Referring to FIG. 8, a radio frame 51A used in the wireless communication with the base station and a radio frame used in the D2D communication 51B are illustrated. For example, the radio frame 51B is shifted backward by the time corresponding to 1 subframe from the radio frame 51A. That is, the radio frame 51B is transmitted by the terminal device 100, so as to get behind the radio frame 51A by the time corresponding to 1 subframe. As a result, the timing to transmit the synchronization signal for the D2D communication is a timing after 1 subframe from the timing of the synchronization signal for the wireless communication with the base station 200. For example, as described above, the transmission control unit 167 controls the timing to transmit the synchronization signal for the D2D communication.

Thereby, the synchronization signal transmitted by the base station 100 in the cell 21 and the synchronization signal for the D2D communication transmitted by the terminal device 100 are transmitted at different timings. As a result, for example, the synchronization signal for the D2D communication transmitted by the terminal device 100 does not interfere with the synchronization signal transmitted by the base station 100. Hence, the possibility that the synchronization fails in the cell 21 is prevented from increasing.

Note that the timing of the synchronization signal obtained by the detection of the synchronization signal for the wireless communication with the base station 200 may be the transmission timing of the synchronization signal by the base station 200, and may be the reception timing of the synchronization signal by the terminal device 100. For example, the transmission timing of the synchronization signal by the base station 200 can be calculated on the basis of the timing advance value.

As the second example, the transmission control unit 167 may control the timing to transmit the synchronization signal for the D2D communication, in such a manner to set at the same timing as the timing of the synchronization signal obtained by the detection of the synchronization signal for the wireless communication with the base station 200. In the following, with respect to this point, a specific example will be described with reference to FIG. 9.

Figure 9:
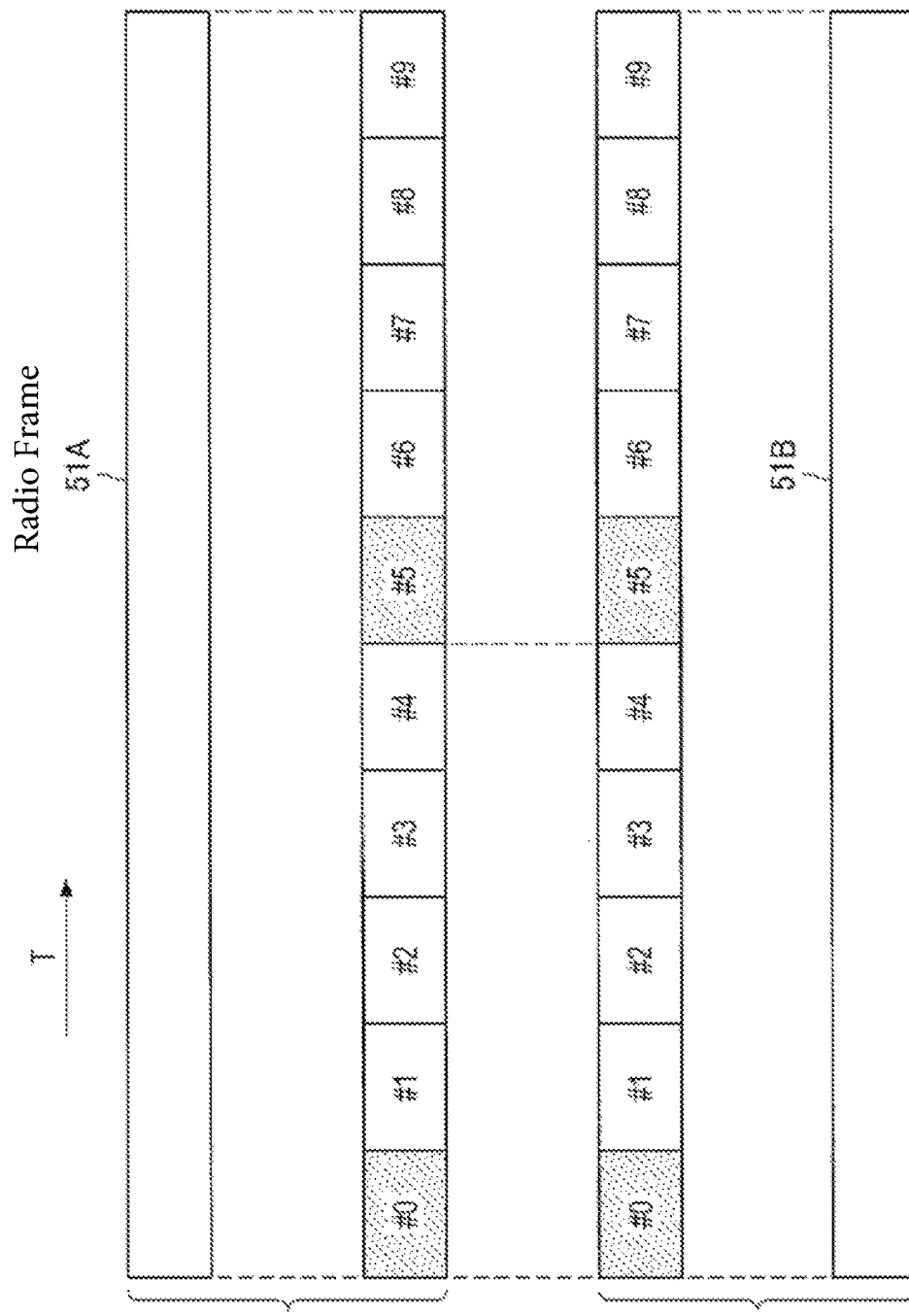
FIG. 9 is an explanatory diagram for describing a second example of a timing at which a terminal device transmits a synchronization signal for D2D communication in an embodiment.

FIG. 9 is an explanatory diagram for describing the second example of the timing at which the terminal device transmits the synchronization signal for the D2D communication in the present embodiment. Referring to FIG. 9, a radio frame 51A used in the wireless communication with the base station and a radio frame used in the D2D communication 51B are illustrated. As illustrated in FIG. 9, the radio frame 51B is transmitted by the terminal device 100 at the same timing as the radio frame 51A. As a result, the timing to transmit the synchronization signal for the D2D communication is same as the timing of the synchronization signal for the wireless communication with the base station 200. For example, as described above, the transmission control unit 167 controls the timing to transmit the synchronization signal for the D2D communication.

Thereby, the synchronization signal transmitted by the base station 100 in the cell 21 and the synchronization signal for the D2D communication by the terminal device 100 are transmitted at the same timing. As a result, for example, the same timing as the cellular communication is used for the D2D communication as well, in the cell 21 and its vicinity. Hence, for example, the control of the D2D communication by the base station 200 can be simplified more.

Note that, as described in connection with the first example, the timing of the synchronization signal obtained by the detection of the synchronization signal for the wireless communication with the base station 200 may be the transmission timing of the synchronization signal by the base station 200, and may be the reception timing of the synchronization signal by the terminal device 100.

Also, in the second example, on the basis of the timing of the synchronization signal obtained from the detection result of the synchronization signal in a certain radio frame, the transmission timing of the synchronization signal for the D2D communication in the radio frame after the above certain radio frame may be controlled. As one example, on the basis of the timing of the synchronization signal obtained from the detection result of the synchronization signal in the radio frame in which the system frame number (SFN)=N, the timing of the synchronization signal for the D2D communication in the radio frame in which SFN=N+1 may be controlled.

Also, the terminal device 100 may be such that it does not transmit the synchronization signal for the D2D communication in the radio frame in which the synchronization signal for the wireless communication with the base station 200 is detected, but transmits the synchronization signal for the D2D communication in the radio frame in which the synchronization signal for the wireless communication with the base station 200 is not detected. As described above, the detection of the synchronization signal for the wireless communication with the base station 200 and the transmission of the synchronization signal for the D2D communication may be each performed intermittently.

Transmission Control of Discovery Signal

The transmission control unit 167 controls the transmission of the discovery signal with which the terminal device 100 can be discovered for the purpose of the D2D communication.

For example, the transmission control unit 167 controls the transmission of the above discovery signal, in such a manner that the above discovery signal is transmitted at a predetermined timing in the radio frame.

Transmission Control of Acknowledgement Signal in Response to Discovery Signal

For example, the transmission control unit 167 controls the transmission of an acknowledgement signal in response to the discovery signal transmitted by another terminal device 100.

Specifically, for example, the transmission control unit 167 controls the transmission of the above acknowledgement signal, in such a manner that the above acknowledgement signal is transmitted at a predetermined timing in the radio frame, when the discovery signal transmitted by another terminal device 100 is detected.

(Connection Control Unit 168)

The connection control unit 168 executes a connection establishment procedure.

For example, the connection control unit 168 executes an RRC connection establishment procedure with the base station 100. For example, the connection control unit 168 transmits an RRC connection request message, an RRC connection setup completion message, or the like to the base station 200 via the wireless communication unit 120, and receives an RRC connection setup message or the like from the base station 200.

Also, for example, the connection control unit 168 executes a connection establishment procedure for the D2D communication with another terminal device 100. For example, the connection control unit 168 transmits to and receives from another terminal device 100 various types of messages for the connection establishment, via the wireless communication unit 120.

(Display Control Unit 169)

The display control unit 169 controls the display of an output screen image by the display unit 150. For example, the display control unit 169 generates an output screen image to be displayed by the display unit 150, and displays the output screen image on the display unit 150.

4. CONFIGURATION OF BASE STATION

Figure 10:
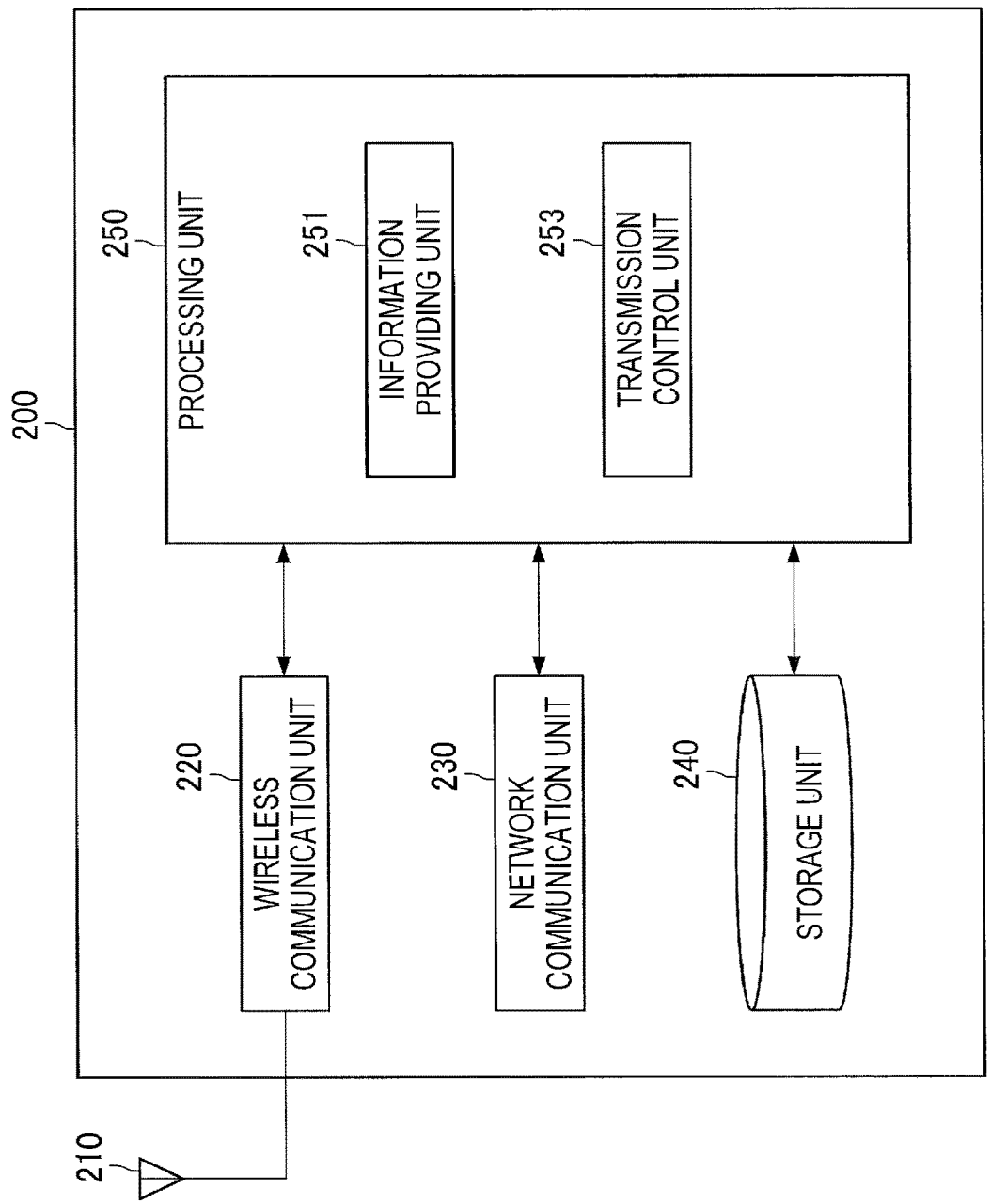
FIG. 10 is a block diagram illustrating an example of a configuration of a base station according to an embodiment.

Next, with reference to FIG. 10, an example of the configuration of the base station 200 according to the present embodiment will be described. FIG. 10 is a block diagram illustrating an example of the configuration of the base station 200 according to the present embodiment. Referring to FIG. 10, the base station 200 includes an antenna unit 210, a wireless communication unit 220, a network communication unit 230, a storage unit 240, and a processing unit 250.

(Antenna Unit 210)

The antenna unit 210 receives a radio signal, and outputs the received radio signal to the wireless communication unit 220. Also, the antenna unit 210 transmits a transmission signal output by the wireless communication unit 220.

(Wireless Communication Unit 220)

The wireless communication unit 220 communicates wirelessly with the terminal device 100 that are positioned in the cell 21 formed by the base station 200.

(Network Communication Unit 230)

The network communication unit 230 communicates with another communication node. For example, the network communication unit 230 communicates with another base station 200. Also, for example, the network communication unit 230 communicates with a core network node.

(Storage Unit 240)

The storage unit 240 stores programs and data for the operation of the base station 200.

(Processing Unit 250)

The processing unit 250 provides various functions of the base station 200. The processing unit 250 includes an information providing unit 251 and a transmission control unit 253.

(Information Providing Unit 251)

The information providing unit 251 provides the terminal device 100 with various types of information. For example, the information providing unit 251 provides the terminal device 100 with information in system information. Also, for example, the information providing unit 251 provides the terminal device 100 with information by the RRC signaling. Note that the information providing unit 251 provides the terminal device 100 with information, via the wireless communication unit 220.

(Transmission Control Unit 253)

The transmission control unit 253 controls the transmission of the synchronization signal for the wireless communication with the base station 200.

For example, the synchronization signal for the wireless communication with the base station 200 includes a PSS and an SSS.

Also, for example, FDD is adopted for the wireless communication between the base station 200 and the terminal device 100. In this case, the PSS is transmitted at OFDM symbol #6 (i.e., the seventh OFDM symbol of the subframe) of the first slot of each of subframe #0 and subframe #5. Further, the SSS is transmitted at OFDM symbol #5 (i.e., the sixth OFDM symbol of the subframe) of the first slot of each of subframe #0 and subframe #5.

Also, TDD may be adopted for the wireless communication between the base station 200 and the terminal device 100. In this case, the PSS may be transmitted at OFDM symbol #2 (i.e., the third OFDM symbol of the subframe) of the first slot of each of subframe #1 and subframe #6. Further, the SSS may be transmitted at OFDM symbol #6 (i.e., the fourteenth OFDM symbol of the subframe) of the second slot of each of subframe #0 and subframe #5.

5. SEQUENCE OF PROCESS

Figure 11:
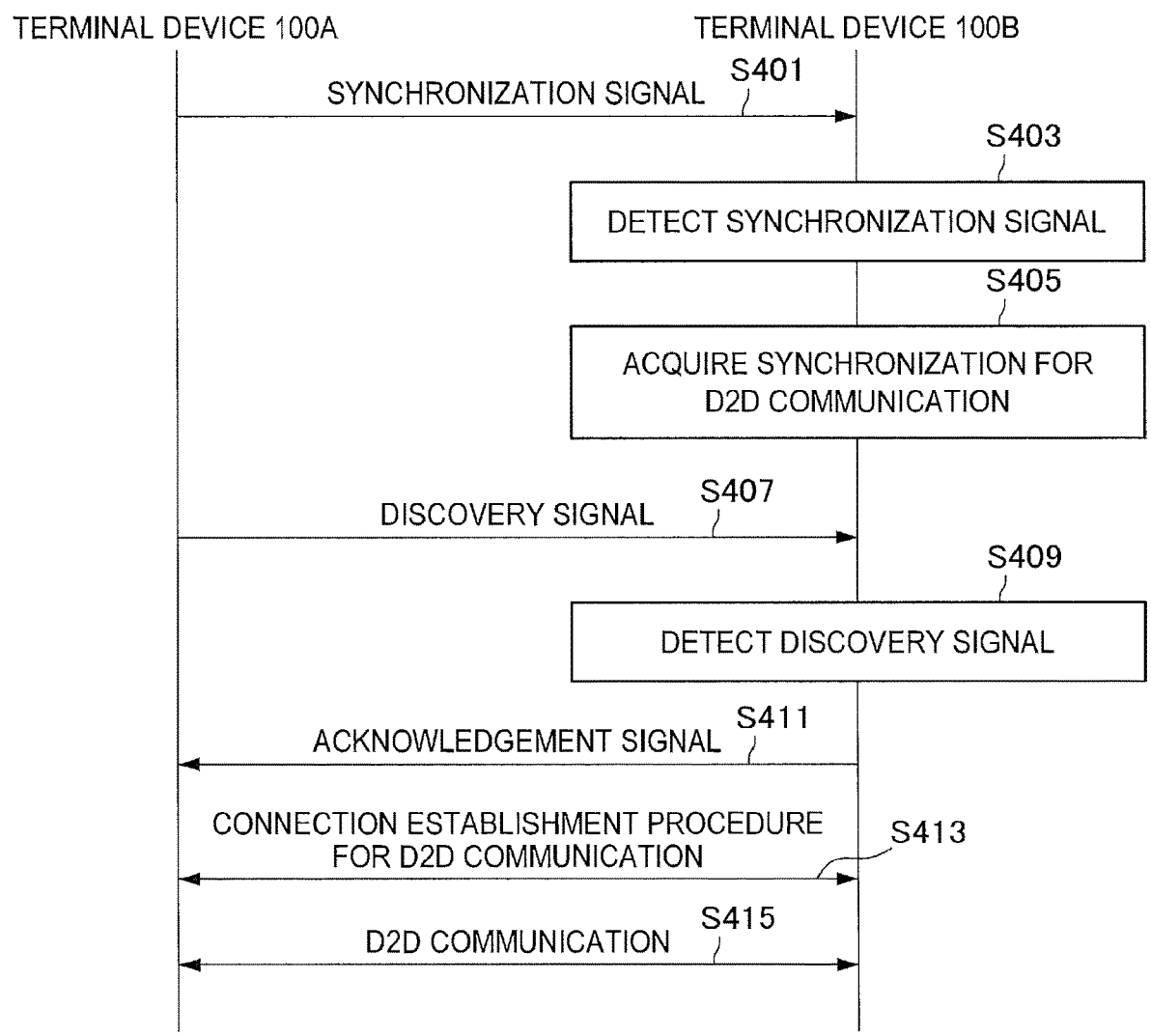
FIG. 11 is a sequence diagram illustrating an example of a schematic flow of a communication control process according to an embodiment.

Next, with reference to FIG. 11, an example of the communication control process according to the present embodiment will be described. FIG. 11 is a sequence diagram illustrating an example of the schematic flow of the communication control process according to the present embodiment. The communication control process is a process until the D2D communication between the terminal devices 100 is performed.

First, the terminal device 100A transmits a synchronization signal for the D2D communication (S401). In the present embodiment, the timing of the above synchronization signal in the frame structure of the radio frame is same as the timing of the synchronization signal for the wireless communication with the base station 200 in the above frame structure.

Then, the terminal device 100B detects the above synchronization signal (S403), and acquires synchronization for the D2D communication on the basis of the detection result of the above synchronization signal (S405).

Further, the terminal device 100A transmits a discovery signal with which the terminal device 100A can be discovered for the purpose of the D2D communication (S407). Then, the terminal device 100B detects the discovery signal (S409), and transmits an acknowledgement signal in response to the discovery signal (S411).

Thereafter, the terminal device 100A and the terminal device 100B performs a connection establishment procedure for the connection establishment for the D2D communication, (S413).

Then, the terminal device 100A and the terminal device 100B perform the D2D communication (S415).

6. EXEMPLARY VARIANT

Next, with reference to FIGS. 12 to 15, first to third exemplary variants according to the present embodiment will be described.

<6.1. First Exemplary Variant>

First, with reference to FIGS. 12 and 13, the first exemplary variant according to the present embodiment will be described.

(Overview)

As described above, in the structure of the radio frame, the timing of the synchronization signal for the D2D communication transmitted by the terminal device 100 is same as the timing of the synchronization signal for the wireless communication with the base station 200. Further, for example, the synchronization signal for the D2D communication transmitted by the terminal device 100 has the same configuration as the synchronization signal for the wireless communication with the base station 200. Thereby, for example, the operation of the terminal device for performing the D2D communication 100 in which the same communication scheme as the communication scheme of the cellular communication is adopted can be simplified more.

However, if the synchronization signal for the D2D communication transmitted by the terminal device 100 has the same configuration as the synchronization signal for the wireless communication with the base station 200, another terminal device 100 is unable to determine whether the synchronization signal is the synchronization signal for the D2D communication or the synchronization signal for the wireless communication with the base station 200, when detecting the synchronization signal. Hence, after the acquisition of the synchronization, the above other terminal device 100 is unable to decide whether to receive the discovery signal of the D2D communication or to acquire the system information provided by the base station 200.

Thus, in the first exemplary variant of the present embodiment, the synchronization signal for the wireless communication with the base station 200 is the signal corresponding to one identifier among one or more identifiers (hereinafter, referred to as "cell ID") for identifying the cell formed by the base station. On the other hand, the synchronization signal for the D2D communication transmitted by the terminal device 100 is the signal corresponding to one identifier among one or more other identifiers (hereinafter, D2D communication ID) different from the above one or more cell IDs.

Thereby, another terminal device 100, which detects the synchronization signal, can determine which synchronization signal has been detected. Hence, the other terminal device 100 can decide the operation after the acquisition of the synchronization.

(Terminal Device 100: Information Acquiring Unit 161)
Acquisition of Priority Information For example, the synchronization signal for the D2D communication transmitted by the terminal device 100 is the signal corresponding to one identifier among a plurality of other identifiers (i.e., D2D communication ID) different from the above one or more cell IDs. Then, in the first exemplary variant of the present embodiment, for example, the information acquiring unit 161 acquires priority information indicating the priority of detection among the signals corresponding to the above plurality of D2D communication IDs.

Specifically, for example, when the base station 200 provides the above priority information in the system information or by RRC signaling, the information acquiring unit 161 acquires the priority information via the wireless communication unit 120. Then, the above acquired priority information is retained. That is, the above acquired priority information is stored in the storage unit 130.

Selection of Priority Information

For example, the information acquiring unit 161 acquires first priority information indicating the above priority and second priority information indicating the above priority. Specifically, for example, the above first priority information is the priority information retained by the terminal device 100 (i.e., the priority information store in the storage unit 130), and the above second priority information is the priority information provided by another terminal device 100 via the D2D communication. Note that the information acquiring unit 161 can provide the above first priority information to another terminal device 100 via the D2D communication.

Also, each of the above first priority information and the above second priority information includes information indicating an acquisition time or an acquisition site when provided by the base station 200. Then, the information acquiring unit 161 selects one of the above first priority information and the above second priority information, on the basis of the information of the above acquisition time or the above acquisition site included in the above first priority information and the above second priority information. As one example, the information acquiring unit 161 selects the one acquired from the base station 200 more recently, among the first priority information and the second priority information, on the basis of the above acquisition time. As another example, the information acquiring unit 161 may select the one acquired at a closer position, among the first priority information and the second priority information, on the basis of the above acquisition site.

Thereafter, for example, the above selected priority information is retained. That is, the above selected priority information is stored in the storage unit 130. Also, for example, the priority information that is not selected is discarded. That is, the priority information that is not selected is erased from the storage unit 130.

(Terminal Device 100: Signal Detection Unit 163)
Detection of Synchronization Signal As described above, the signal detection unit 163 detects the synchronization signal for the wireless communication with the base station 200. Also, the signal detection unit 163 detects the synchronization signal for the D2D communication transmitted by another terminal device 100.

Detection of Synchronization Signal for Wireless Communication with Base Station and Synchronization Signal for D2d Communication In particular, in the first exemplary variant, for example, the signal detection unit 163 detects the reception signal corresponding to one cell ID among one or more cell IDs, as the synchronization signal for the wireless communication with the base station 200. Also, for example, the signal detection unit 163 detects the reception signal corresponding to one D2D communication ID among one or more D2D communication IDs, as the synchronization signal for the D2D communication transmitted by another terminal device 100. In the following, with respect to this point, a specific example will be described with reference to FIG. 12.

Figure 12:
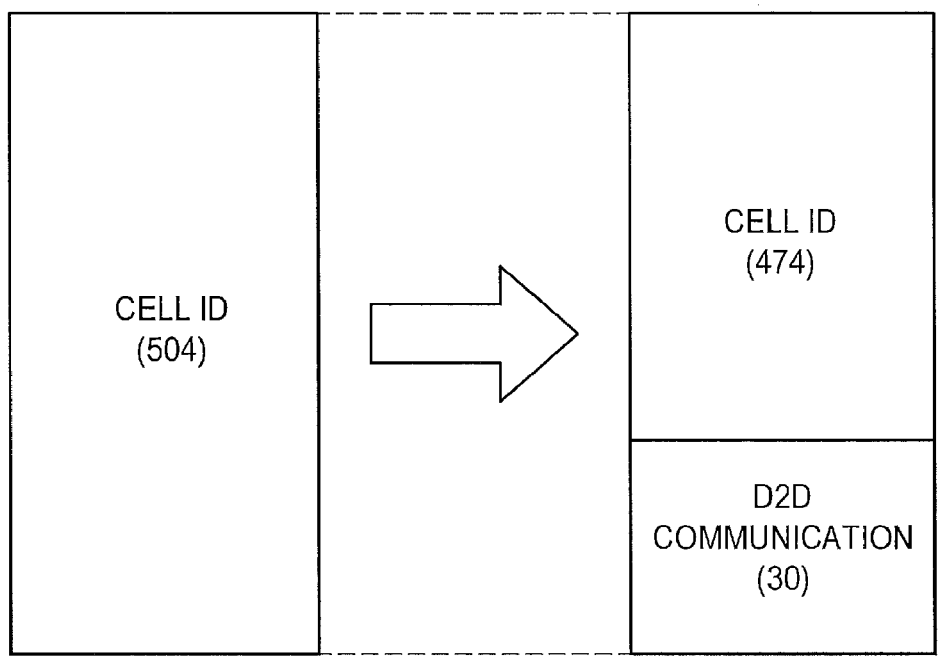
FIG. 12 is an explanatory diagram for describing an example of a cell ID and a D2D communication ID according to a first exemplary variant of an embodiment.
Figure 13:
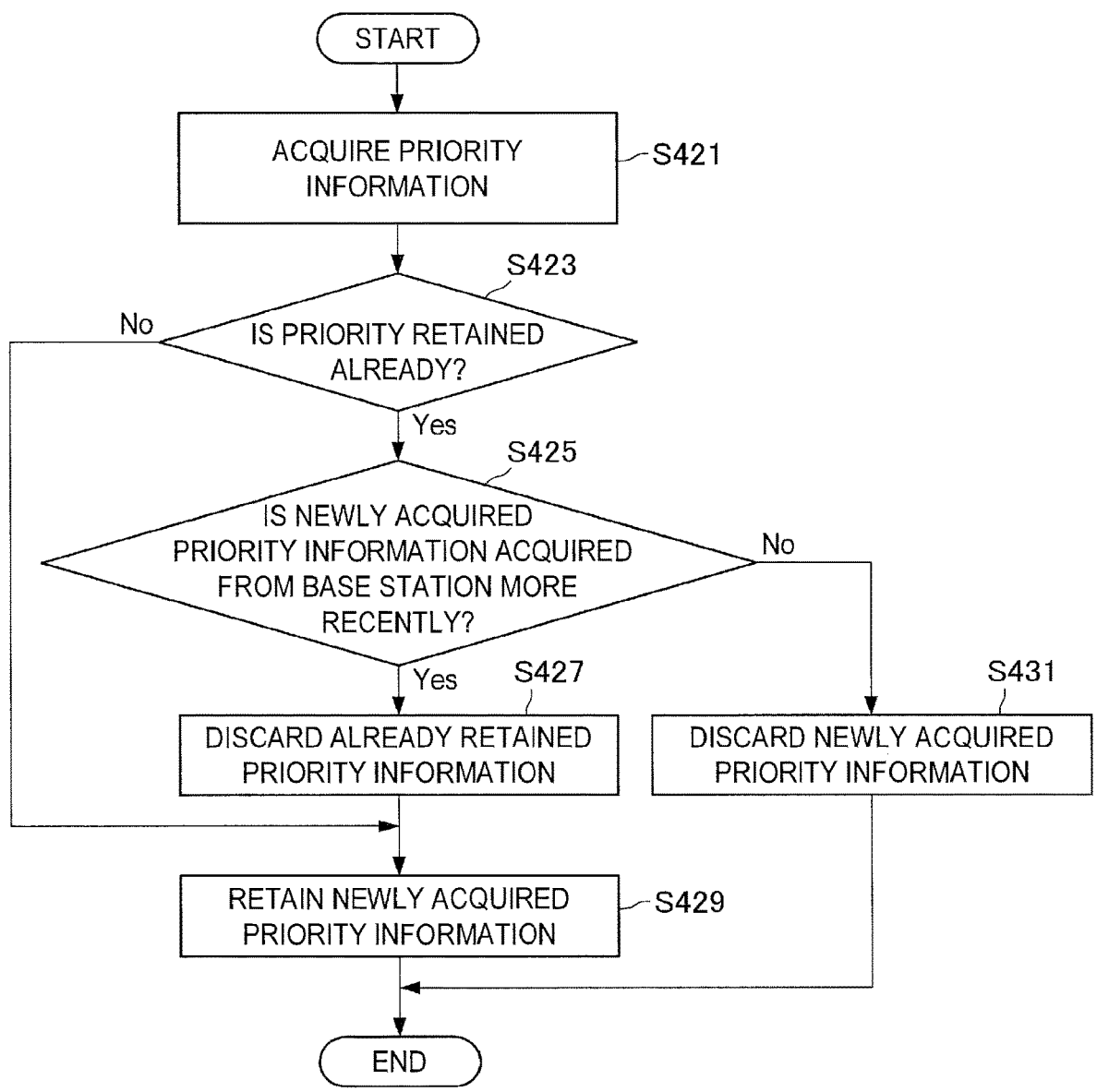
FIG. 13 is a flowchart illustrating an example of a schematic flow of a process for selecting priority information in a first exemplary variant of an embodiment.

FIG. 12 is an explanatory diagram for describing an example of the cell ID and the D2D communication ID according to the first exemplary variant of the present embodiment. Referring to FIG. 12, the cell ID of the past and the ID according to the first exemplary variant of the present embodiment are illustrated. In the communication system of the past, 504 (168×3) IDs are prepared as cell IDs, and the synchronization signal (the PSS and the SSS) corresponds to one of the cell IDs. Also, one of the sequences corresponds to each of these 504 IDs. On the other hand, in the first exemplary variant of the present embodiment, a part (for example, 30 IDs) among 504 IDs are prepared as the D2D communication ID, and the remainder (for example, 474 IDs) among 504 IDs are prepared as the cell ID in the same way as the past. Also, in the first exemplary variant of the present embodiment as well, one of the sequences corresponds to each of 504 IDs (474 cell IDs and 30 D2D communication IDs).

As a specific process, for example, when the sequence corresponding to the cell ID and the sequence of the reception signal match each other, the signal detection unit 163 detects the reception signal as the synchronization signal for the wireless communication with the base station 200. Also, when the sequence corresponding to the D2D communication ID and the sequence of the reception signal match each other, the signal detection unit 163 detects the reception signal as the synchronization signal for the D2D communication transmitted by another terminal device 100.

Note that one or more D2D communication IDs and the sequences corresponding to one or more D2D communication IDs are stored in advance in the storage unit 130, for example. One or more D2D communication IDs and the sequences corresponding to one or more D2D communication IDs may be stored in the storage unit 130 by an operator before shipment or sale of the terminal device 100, or may be provided in the system information or by the RRC signaling and stored in the storage unit 130.

Detection of Synchronization Signal for D2D Based on Priority Information

For example, the signal detection unit 163 detects the synchronization signal for the D2D communication transmitted by another terminal device 100, in accordance with the priority of detection among the signals corresponding to a plurality of D2D communication IDs.

Specifically, for example, the signal detection unit 163 checks whether the signal (sequence) corresponding to the D2D communication ID and the reception signal (sequence) match each other, in the order from the signal with a higher priority among the signals (sequences) corresponding to a plurality of D2D communication IDs. Then, the signal detection unit 163 detects the reception signal (sequence) that matches the signal (sequence) corresponding to the D2D communication ID, as the synchronization signal for the D2D communication.

By the above detection in accordance with priority, the synchronization signal for the D2D communication is detected more efficiently, for example.

Note that, for example, when the information acquiring unit 161 acquires the first priority information and the second priority information, the signal detection unit 163 detects the synchronization signal for the D2D communication in accordance with the priority indicated by the one selected from among the above first priority information and the above second priority information.

Thereby, for example, the synchronization signal for the D2D communication can be detected in accordance with newer priority. As a result, for example, even when the terminal device 100 that is about to perform the D2D communication is positioned outside the cell 21, the synchronization signal for the D2D communication is detected more efficiently.

(Terminal Device 100: Transmission Control Unit 167)
Transmission Control of Synchronization Signal As described above, the transmission control unit 167 controls the transmission of the synchronization signal for the D2D communication.

In particular, in the first exemplary variant of the present embodiment, the synchronization signal for the wireless communication with the base station 200 is the signal corresponding to one cell ID among one or more cell IDs. On the other hand, the synchronization signal for the D2D communication transmitted by the terminal device 100 is the signal corresponding to one D2D communication ID among one or more D2D communication IDs different from the above one or more cell IDs. This point is as described above with reference to FIG. 12.

As a specific process, for example, the transmission control unit 167 controls the transmission of the synchronization signal for the D2D communication, in such a manner that the sequence corresponding to one D2D communication ID is transmitted as the synchronization signal for the D2D communication. As one example, referring to FIG. 12 again, the sequence corresponding to one D2D communication ID among 30 D2D communication IDs is transmitted as the synchronization signal for the D2D communication.

Note that, for example, not only one D2D communication ID, but a plurality of D2D communication IDs are prepared. That is, the synchronization signal for the D2D communication transmitted by the terminal device 100 is the signal corresponding to one D2D communication ID among a plurality of D2D communication IDs different from the above one or more cell IDs. As described above, a plurality of D2D communication IDs are prepared, and thereby different IDs can be used for a plurality of D2D communication groups, for example.

(Base Station 200: Information Providing Unit 251)

In particular, in the first exemplary variant, for example, the information providing unit 251 provides the terminal device 100 with the priority information indicating the priority of detection among the signals corresponding to a plurality of D2D communication IDs. The information providing unit 251 may provide the above priority information in the system information, or may provide the above priority information by the RRC signaling.

(Sequence of Process)
Communication Control Process

First, the communication control process according to the first exemplary variant of the present embodiment is same as the communication control process according to the present embodiment described with reference to FIG. 11.

Note that, in the first exemplary variant in particular, the terminal device 100A transmits the signal (sequence) corresponding to one D2D communication ID among the D2D communication IDs, as the synchronization signal for the D2D communication, in the transmission of the synchronization signal for the D2D communication (S401).

Also, in the first exemplary variant in particular, the terminal device 100B detects the reception signal corresponding to one D2D communication ID among one or more D2D communication IDs, as the synchronization signal for the D2D communication, in the detection of the synchronization signal for the D2D communication (S403). Also, for example, the terminal device 100B detects the synchronization signal for the D2D communication, in accordance with the priority of detection among the signals corresponding to a plurality of D2D communication IDs.

Selection of Priority Information

Next, with reference to FIG. 13, an example of the process for the selection of the priority information in the first exemplary variant of the present embodiment will be described. FIG. 13 is a flowchart illustrating an example of the schematic flow of the process for the selection of the priority information in the first exemplary variant of the present embodiment. The process is executed by the terminal device 100.

First, the information acquiring unit 161 acquires the priority information indicating the priority of detection among the signals corresponding to a plurality of D2D communication IDs (S421).

Then, if the priority information indicating the above priority is already retained (S423: Yes), the information acquiring unit 161 determines whether newly acquired priority information is acquired from the base station 200 more recently than the already retained priority information, on the basis of the information of acquisition time included in each priority information (S425).

If the newly acquired priority information is acquired from the base station 200 more recently than the already retained priority information (S425. Yes), the information acquiring unit 161 discards the already retained priority information (S427), and retains the newly acquired priority information (S429). Then, the process ends.

On the other hand, if the newly acquired priority information is acquired from the base station 200 before the already retained priority information (S425: No), the information acquiring unit 161 discards the newly acquired priority information (S431). Then, the process ends.

Note that, if the priority information indicating the above priority is not retained yet (S423: No), the information acquiring unit 161 retains the newly acquired priority information (S429). Then, the process ends.

<6.2. Second Exemplary Variant>

Next, the second exemplary variant according to the present embodiment will be described.

(Overview)

A plurality of base stations do not necessarily synchronize with each other. In particular, a plurality of base stations operated by respective different MNOs are considered to be unsynchronized with each other. As described above, the terminal device 100 positioned in the coverages of different base stations can be unsynchronized with each other, even if acquiring synchronization utilizing the synchronization signal from the base station. Also, a plurality of terminal devices 100 positioned outside the coverage of the base station can transmit the synchronization signal at different timings. Hence, a plurality of terminal devices 100 positioned outside the coverage of the base station can be unsynchronized with each other, even if acquiring synchronization utilizing the synchronization signal for the D2D communication.

As described above, some terminal devices 100 synchronize with each other, and other terminal devices 100 do not synchronize with each other. Here, a group of terminal devices 100 that synchronize with each other is referred to as synchronization group. Then, the terminal devices 100 that belong to the same synchronization group (i.e., the terminal devices 100 that synchronize with each other) are able to perform the D2D communication, but the terminal devices 100 that belong to different synchronization groups (i.e., the terminal devices 100 that do not synchronize with each other) are unable to perform the D2D communication.

On the other hand, the terminal device 100 transmits the discovery signal with which the terminal device 100 can be discovered for the purpose of the D2D communication, at a predetermined timing in the radio frame, for example. Also, the terminal device 100 detects the discovery signal transmitted by another terminal device 100, at the above predetermined timing in the radio frame.

However, when there are different synchronization groups between which synchronization timings are slightly different, the discovery signal transmitted by the terminal device 100 of one synchronization group is detected by the terminal device 100 of another synchronization group, and the acknowledgement signal can be transmitted in response to the discovery signal. It is concerned that the radio resource is wasted by the transmission of this acknowledgement signal.

Thus, in the second exemplary variant of the present embodiment, the signal corresponding to the D2D communication ID corresponding to the synchronization signal for the D2D communication, among one or more D2D communication IDs, is transmitted as the above discovery signal.

Thereby, for example, the terminal device which has received the discovery signal can determine whether the terminal device which has transmitted the discovery signal is the same device as the terminal device which has transmitted the synchronization signal. For example, this enables the terminal device which has received the discovery signal, to transmit the acknowledgement signal when the discovery signal is transmitted by the terminal device which has transmitted the synchronization signal, and to not transmit the acknowledgement signal when the above discovery signal is transmitted by the terminal device different from the terminal device which has transmitted the synchronization signal. As a result, the waste of the radio resources can be reduced.

Also, the D2D communication ID is utilized as the synchronization group ID for identifying the synchronization group, and the terminal devices 100 that belong to the same synchronization group can transmit the discovery signal corresponding to the synchronization group ID. In this case, for example, according to the second exemplary variant, the terminal device which has received the discovery signal can determine whether the terminal device which has transmitted the discovery signal belongs to the same synchronization group as the terminal device which has transmitted the synchronization signal. For example, this enables the terminal device which has received the discovery signal, to transmit the acknowledgement signal when the discovery signal is transmitted by the terminal device that belongs to the same synchronization group, and to not transmit the acknowledgement signal when the above discovery signal is transmitted by the terminal device that belongs to another synchronization group. As a result, the waste of the radio resources can be reduced.

(Terminal Device 100: Transmission Control Unit 167)

Transmission Control of Synchronization Signal

As described above, the transmission control unit 167 controls the transmission of the synchronization signal for the D2D communication. Also, as described in the first exemplary variant, the synchronization signal for the D2D communication transmitted by the terminal device 100 is the signal corresponding to one D2D communication ID among one or more D2D communication IDs.

The above D2D communication ID can be utilized as the synchronization group ID for identifying the synchronization group, for example.

Transmission Control of Discovery Signal

The transmission control unit 167 controls the transmission of the discovery signal with which the terminal device 100 can be discovered for the purpose of the D2D communication.

As described in the first exemplary variant, for example, the synchronization signal for the D2D communication transmitted by the terminal device 100 is the signal corresponding to one D2D communication ID among one or more D2D communication IDs. Then, in the second exemplary variant in particular, the above discovery signal is the signal corresponding to the above one D2D communication ID (the D2D communication ID corresponding to the synchronization signal for the D2D communication) among one or more D2D communication IDs. Note that the above discovery signal can be said to be the signal corresponding to the synchronization group ID.

As described above, this reduces the waste of the radio resources.

Content of Discovery Signal

As the first example, the above discovery signal includes the above one D2D communication ID among one or more D2D communication IDs. That is, the synchronization signal for the D2D communication transmitted by the terminal device 100 corresponds to one D2D communication ID, and the above discovery signal includes the one D2D communication ID.

Specifically, for example, the transmission control unit 167 acquires the D2D communication ID corresponding to the synchronization signal for the D2D communication transmitted by the terminal device 100, and inserts the discovery signal including the acquired D2D communication ID.

For example, this discovery signal enables the terminal device which has received the discovery signal to determine whether the terminal device which has transmitted the discovery signal is the same device as the terminal device which has transmitted the synchronization signal, without having any other information in advance. Alternatively, the terminal device which has received the discovery signal is enabled to determine whether the terminal device which has transmitted the discovery signal belongs to the same synchronization group as the terminal device which has transmitted the synchronization signal, without having any other information in advance.

As the second example, the above discovery signal may be one of one or more signals corresponding to the above one D2D communication ID among one or more D2D communication IDs. That is, it may be such that the synchronization signal for the D2D communication transmitted by the terminal device 100 corresponds to one D2D communication ID, and the above discovery signal is one of one or more signals corresponding to the one D2D communication ID.

Specifically, for example, it may be such that one or more signals (sequences) are prepared for each D2D communication ID, and each terminal device 100 retains in advance each D2D communication ID and the information of the above one or more signals (sequences) prepared for each D2D communication ID. The transmission control unit 167 may acquire the D2D communication ID corresponding to the synchronization signal for the D2D communication transmitted by the terminal device 100, and select one signal (sequence) from among one or more signals (sequences) corresponding to the D2D communication ID. Then, the transmission control unit 167 may insert the above selected one signal as the discovery signal.

For example, this discovery signal allows the discovery signal to not include the D2D communication ID, and thereby makes the data amount of the discovery signal smaller. Note that a plurality of signals corresponding to the D2D communication ID are prepared, to decrease the possibility that the same discovery signal is transmitted by different terminal devices 100 in the same synchronization group, for example. As a result, the possibility of collision of the discovery signals in the synchronization group can be reduced.

(Terminal Device 100: Signal Detection Unit 163)

Detection of Discovery Signal

The signal detection unit 163 detects the discovery signal transmitted by another terminal device 100.

In the second exemplary variant in particular, the above discovery signal is the signal corresponding to the above one D2D communication ID (the D2D communication ID corresponding to the synchronization signal for the D2D communication) among one or more D2D communication IDs.

As described above, as the first example, the synchronization signal for the D2D communication transmitted by the terminal device 100 corresponds to one D2D communication ID, and the above discovery signal includes the one D2D communication ID. In this case, for example, the signal detection unit 163 acquires the D2D communication ID corresponding to the synchronization signal as the detection result of the synchronization signal, and detects the discovery signal including the D2D communication ID.

Also, as described above, as the second example, it may be such that the synchronization signal for the D2D communication transmitted by the terminal device 100 corresponds to one D2D communication ID, and the above discovery signal is one of one or more signals corresponding to the one D2D communication ID. In this case, the terminal device 100 may retain in advance each D2D communication ID and the information of one or more signals (sequences) prepared for each D2D communication ID. Then, the signal detection unit 163 may acquire the D2D communication ID corresponding to the synchronization signal as the detection result of the synchronization signal, and acquire the information of one or more signals (sequences) corresponding to the D2D communication ID, and then detect the discovery signal which is one signal of the above one or more signals.

(Terminal Device 100: Transmission Control Unit 167 Continuation)

Transmission Control of Acknowledgement Signal in Response to Discovery Signal

For example, the transmission control unit 167 controls the transmission of the acknowledgement signal in response to the discovery signal transmitted by another terminal device 100.

Specifically, for example, the transmission control unit 167 acquires the D2D communication ID corresponding to the synchronization signal for the D2D communication. Then, when the discovery signal corresponding to the D2D communication ID is detected, the transmission control unit 167 controls the transmission of the above acknowledgement signal in such a manner that the above acknowledgement signal is transmitted at a predetermined timing in the radio frame.

(Sequence of Process)

Communication Control Process

First, the communication control process according to the second exemplary variant of the present embodiment is same as the communication control process according to the first exemplary variant of the present embodiment.

Note that, in the second exemplary variant in particular, the discovery signal is the signal corresponding to the D2D communication ID corresponding to the synchronization signal for the D2D communication transmitted by the terminal device 100A, in transmission of the discovery signal (S407) and detection of the discovery signal (S409).

Also, in the detection of the discovery signal (S409), the terminal device 100B does not perform the transmission (S411) of the acknowledgement signal, when not detect the above discovery signal. Then, the following each process (S413 and S415) is not performed either.

<6.3. Third Exemplary Variant>

Next, with reference to FIGS. 14 and 15, the third exemplary variant according to the present embodiment will be described.

(Overview)

As described in the first exemplary variant, for example, not only one D2D communication ID, but a plurality of D2D communication IDs are prepared. However, it is possible that different terminal devices 100 (or the terminal devices 100 that belong to different synchronization groups) transmits the synchronization signal corresponding to the same D2D communication ID. Hence, for example, it is possible that the same synchronization signal is transmitted by two or more terminal devices 100, and another terminal device 100 receives the synchronization signal from the above two or more terminal devices 100. As a result, it is concerned that the above other terminal device 100 becomes unable to acquire synchronization.

Thus, in the third exemplary variant of the present embodiment, the synchronization signal for the D2D communication transmitted by the terminal device 100 is changed from the signal corresponding to one D2D communication ID among a plurality of D2D communication IDs, to the signal corresponding to another D2D communication ID among a plurality of D2D communication IDs.

For example, this prevents the synchronization from being unacquirable continually due to the same synchronization signal transmitted by two or more terminal devices 100.

(Terminal Device 100: Synchronization Control Unit 165)

In particular, in the third exemplary variant, for example, the synchronization control unit 165 determines whether the same synchronization signal is transmitted by two or more other terminal devices 100. More specifically, for example, the synchronization control unit 165 determines that the same synchronization signal is transmitted by two or more other terminal devices 100, when three or more PSSs or three or more SSSs are detected in one radio frame.

For example, it is assumed that the synchronization control unit 165 determines that the same synchronization signal is transmitted by two or more other terminal devices 100. In this case, the synchronization control unit 165 notifies another terminal device 100 connected to the terminal device 100 among the above two or more other terminal devices 100, that the same synchronization signal is transmitted by another device. In the following, with reference to FIG. 14, a specific example of a case in which this notification is transmitted will be described.

Figure 14:
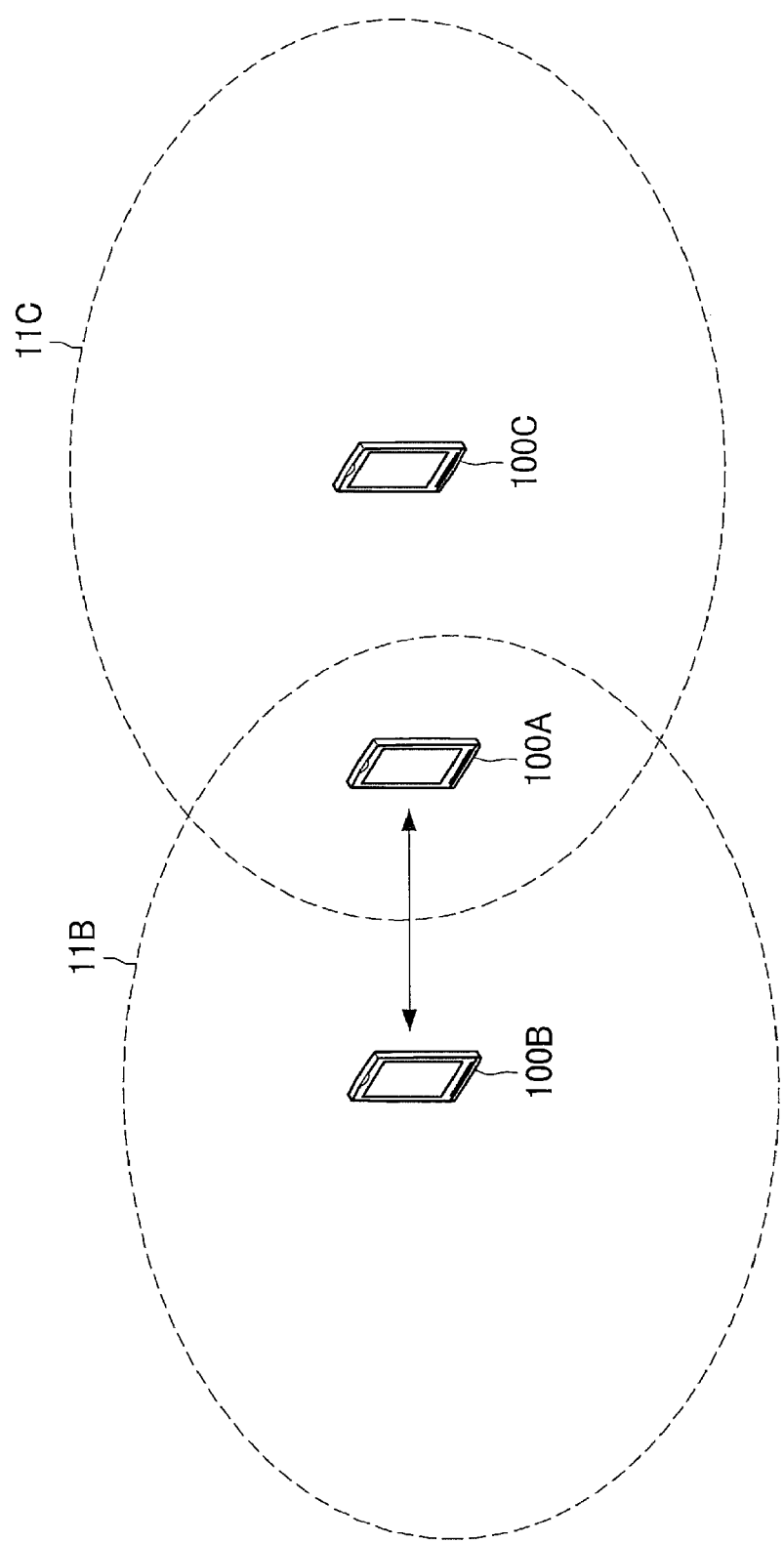
FIG. 14 is an explanatory diagram for describing an example of a case in which notification is performed according to a third exemplary variant of an embodiment.

FIG. 14 is an explanatory diagram for describing an example of the case in which the notification is transmitted according to the third exemplary variant of the present embodiment. Referring to FIG. 15, a terminal device 100A, a terminal device 100B, and a terminal device 100C are illustrated. The terminal device 100A is positioned inside the communication range 11B of the terminal device 100B, and is connected to the terminal device 100B. That is, the terminal device 100A is capable of performing the D2D communication with the terminal device 100B. On the other hand, the terminal device 100A is positioned inside the communication range 11C of the terminal device 100C, but is not connected to the terminal device 100C. Then, in this example, the terminal device 100B and the terminal device 100C transmit the same synchronization signal. As a result, the terminal device 100A detects three or more PSSs and three or more SSSs in one radio frame, and therefore is unable to acquire synchronization for the D2D communication with the terminal device 100B. Then, the terminal device 100A notifies the terminal device 100B that the same synchronization signal is transmitted by another device.

(Terminal Device 100: Transmission Control Unit 167)

Transmission Control of Synchronization Signal

As described above, the transmission control unit 167 controls the transmission of the synchronization signal for the D2D communication.

In particular, in the third exemplary variant, the synchronization signal for the D2D communication transmitted by the terminal device 100 is the signal corresponding to one D2D communication ID among a plurality of D2D communication IDs different from the above one or more cell IDs.

Also, in the third exemplary variant in particular, for example, the transmission control unit 167 changes the synchronization signal for the D2D communication, from the signal corresponding to one D2D communication ID among a plurality of D2D communication IDs, to the signal corresponding to another D2D communication ID among the above plurality of D2D communication IDs, in response to the notification from another terminal device 100. For example, the notification from the above other terminal device 100 is a notification indicating that the same synchronization signal is transmitted by another device.

Thereby, the synchronization signal can be changed, when the same synchronization signal is transmitted by two or more terminal devices 100, and another terminal device 100 becomes unable to acquire synchronization actually, for example. Hence, the above other terminal device 100 is prevented from being unable to acquire synchronization continually. Also, for example, the synchronization signal is changed only when necessary, and therefore a situation in which frequent reacquisition of the synchronization is necessary is prevented.

Note that, as another example, the transmission control unit 167 may change the synchronization signal for the D2D communication periodically, from the signal corresponding to one D2D communication ID among a plurality of D2D communication IDs, to the signal corresponding to another D2D communication ID among the above plurality of D2D communication IDs.

Thereby, for example, the same synchronization signal is prevent from being transmitted continually by two or more terminal devices 100. Hence, the terminal device 100 that are positioned at the vicinity of the above two or more terminal devices 100 is prevented from being unable to acquire synchronization continually.

(Sequence of Process)

Figure 15:
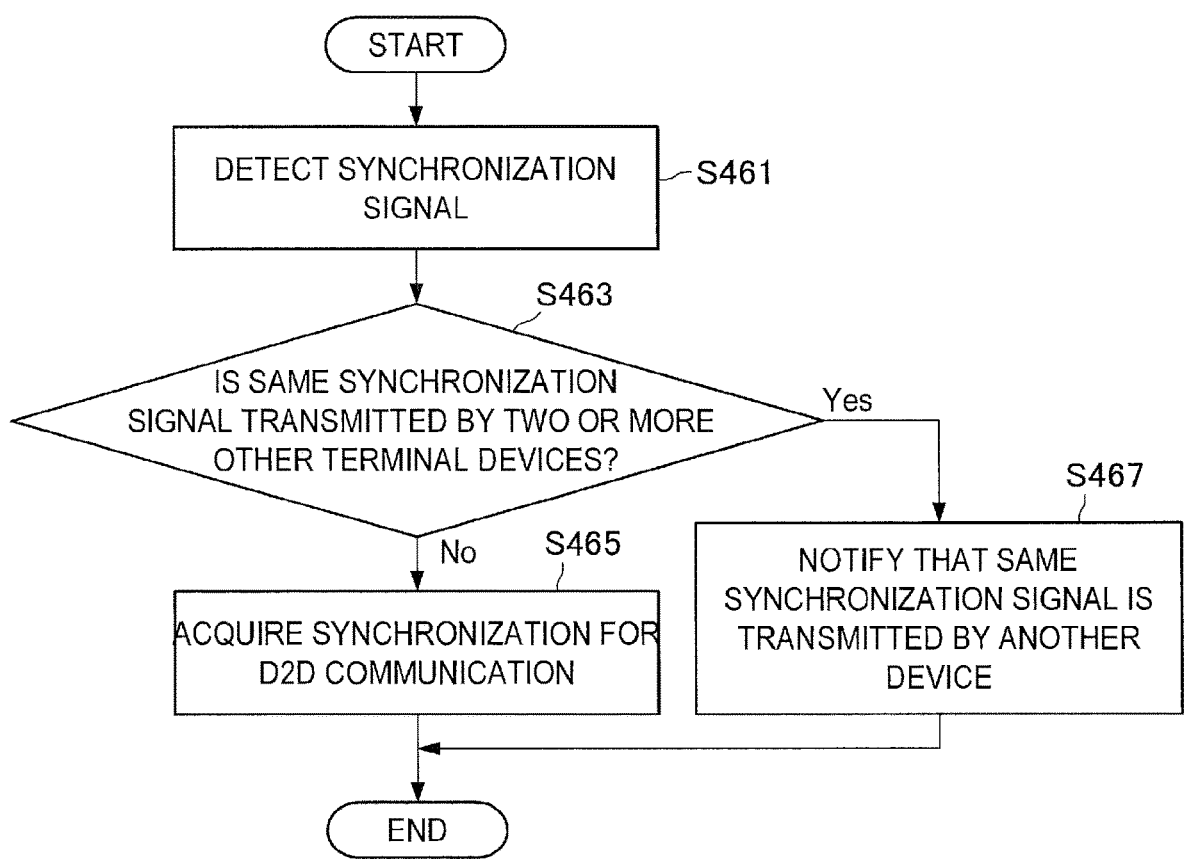
FIG. 15 is a flowchart illustrating an example of a schematic flow of a process for a notification according to the third exemplary variant of an embodiment.

With reference to FIG. 15, an example of the process for the notification according to the third exemplary variant of the present embodiment will be described. FIG. 15 is a flowchart illustrating an example of the schematic flow of the process for the notification according to the third exemplary variant of the present embodiment. The process is executed by the terminal device 100.

The signal detection unit 163 detects the synchronization signal (the PSS and the SSS) for the D2D communication transmitted by another terminal device 100 (S461).

Then, the synchronization control unit 165 determines whether the same synchronization signal is transmitted by two or more other terminal devices 100 (S463).

If the same synchronization signal is not transmitted by two or more other terminal devices 100 (S463: No), the synchronization control unit 165 acquires synchronization for the D2D communication, on the basis of the detection result of the synchronization signal for the D2D communication transmitted by another terminal device 100 (S465). Then, the process ends.

On the other hand, if the same synchronization signal is transmitted by two or more other terminal devices 100 (S463: Yes), the synchronization control unit 165 notifies another terminal device 100 connected to the terminal device 100 among the above two or more other terminal devices 100, that the same synchronization signal is transmitted by another device (S467). Then, the process ends.

7. APPLICATION

The technology related to the present disclosure can be applied to various products. For example, the base station 200 may be realized as any one kind of evolved NodeB (eNB) such as a macro eNB (MeNB), a pico eNB (PeNB), or a home eNB (HeNB). Instead, the base station 200 may be realized as another kind of base station such as a NodeB or a base transceiver station (BTS). The base station 200 may include a main body (also referred to as a base station device) controlling radio communication and at least one remote radio head (RRH) disposed at a different location than the main body.

Further, the terminal device 100 may be realized as, for example, a mobile terminal such as a smartphone, a tablet personal computer (PC), a notebook PC, a portable game console, or a digital camera, or as an in-vehicle terminal such as a car navigation device. In addition, the terminal device 100 may also be realized as a terminal that conducts machine-to-machine (M2M) communication (also called a machine-type communication (MTC) terminal). Furthermore, the terminal device 100 may be a radio communication module mounted onboard these terminals (for example, an integrated circuit module configured on a single die).

<<7.1. Applications Related to Base Station>>
(First Application)

Figure 16:
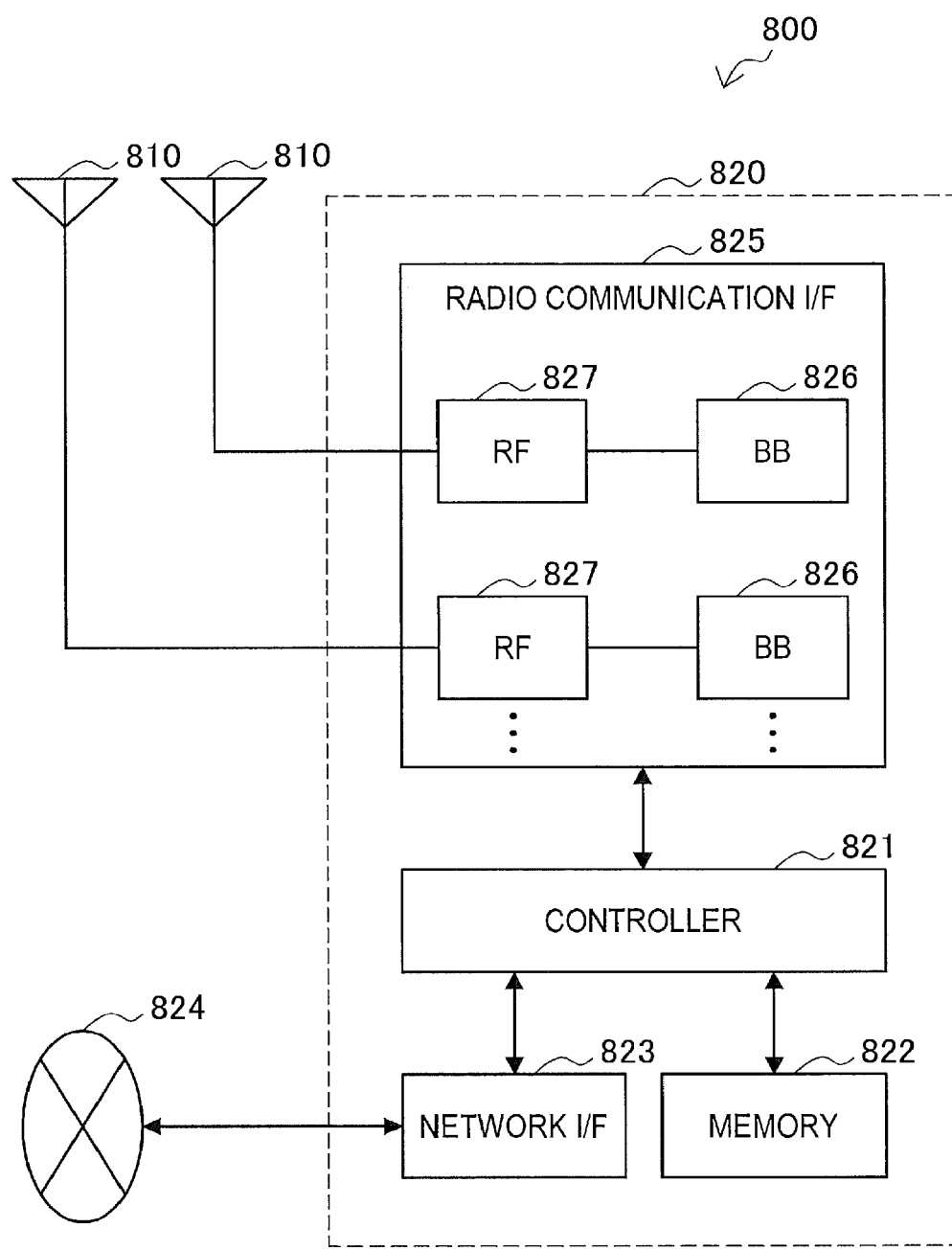
FIG. 16 is a block diagram illustrating a first example of a schematic configuration of an eNB.

FIG. 16 is a block diagram illustrating a first example of a schematic configuration of an eNB to which technology according to an embodiment of the present disclosure may be applied. An eNB 800 includes one or more antennas 810, and a base station device 820. The respective antennas 810 and the base station device 820 may be connected to each other via an RF cable.

Each antenna 810 includes a single or a plurality of antenna elements (for example, a plurality of antenna elements constituting a MIMO antenna), and is used by the base station device 820 to transmit and receive radio signals. The eNB 800 may include a plurality of antennas 810 as illustrated in FIG. 16, and the plurality of antennas 810 may respectively correspond to a plurality of frequency bands used by the eNB 800, for example. Note that although FIG. 16 illustrates an example of the eNB 800 including a plurality of antennas 810, the eNB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from a plurality of baseband processors, and forward the generated bundled packet. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in a layer 1, a layer 2 (for example, Medium Access Control (MAC), Radio Link Control (RLC), and Packet Data Convergence Protocol (PDCP)), and a layer 3 (for example, Radio Resource Control (RRC)). The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include a plurality of BB processors 826 as illustrated in FIG. 16, and the plurality of BB processors 826 may respectively correspond to a plurality of frequency bands used by the eNB 800, for example. In addition, the radio communication interface 825 may also include a plurality of RF circuits 827 as illustrated in FIG. 16, and the plurality of RF circuits 827 may respectively correspond to a plurality of antenna elements, for example. Note that although FIG. 16 illustrates an example of the radio communication interface 825 including a plurality of BB processors 826 and a plurality of RF circuits 827, the radio communication interface 825 may also include a single BB processor 826 or a single RF circuit 827.

(Second Application)

Figure 17:
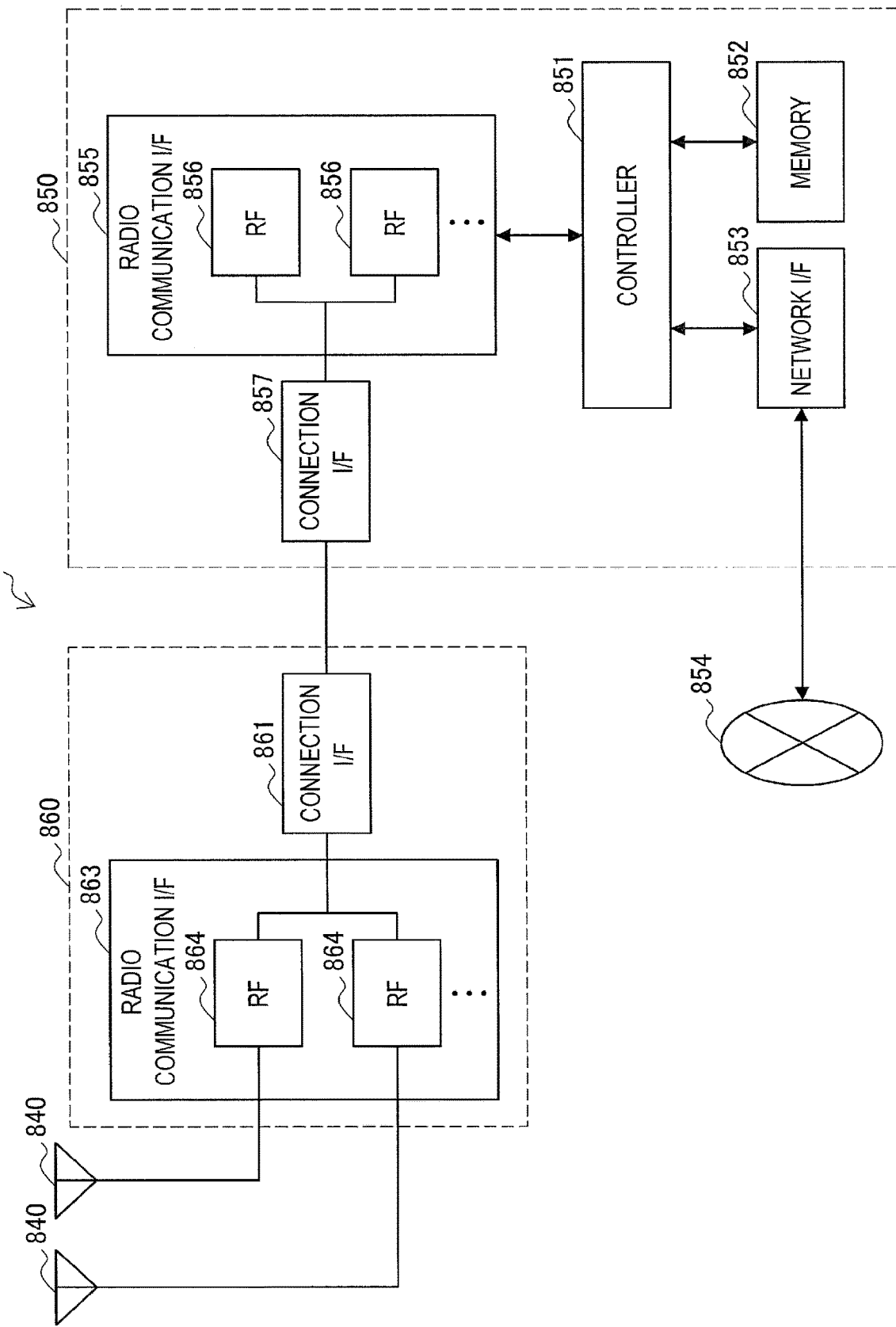
FIG. 17 is a block diagram illustrating a second example of a schematic configuration of an eNB.

FIG. 17 is a block diagram illustrating a second example of a schematic configuration of an eNB to which technology according to an embodiment of the present disclosure may be applied. An eNB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or a plurality of antenna elements (for example, a plurality of antenna elements constituting a MIMO antenna), and is used by the RRH 860 to transmit and receive radio signals. The eNB 830 may include a plurality of antennas 840 as illustrated in FIG. 17, and the plurality of antennas 840 may respectively correspond to a plurality of frequency bands used by the eNB 830, for example. Note that although FIG. 17 illustrates an example of the eNB 830 including a plurality of antennas 840, the eNB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 16.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 16, except for being connected to an RF circuit 864 of the RRH 860 via the connection interface 857. The radio communication interface 855 may also include a plurality of BB processors 856 as illustrated in FIG. 17, and the plurality of BB processors 856 may respectively correspond to a plurality of frequency bands used by the eNB 830, for example. Note that although FIG. 17 illustrates an example of the radio communication interface 855 including a plurality of BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include a plurality of RF circuits 864 as illustrated in FIG. 17, and the plurality of RF circuits 864 may respectively correspond to a plurality of antenna elements, for example. Note that although FIG. 17 illustrates an example of the radio communication interface 863 including a plurality of RF circuits 864, the radio communication interface 863 may also include a single RF circuit 864.

In the eNB 800 and the eNB 830 illustrated in FIGS. 16 and 17, the information providing unit 251 and the transmission control unit 253 described using FIG. 10 may be implemented in the radio communication interface 825, and the radio communication interface 855, and/or the radio communication interface 863. Also, at least a part of these functions may be implemented in the controller 821 and the controller 851.

<<7.2. Applications Related to Terminal Device>>
(First Application)

Figure 18:
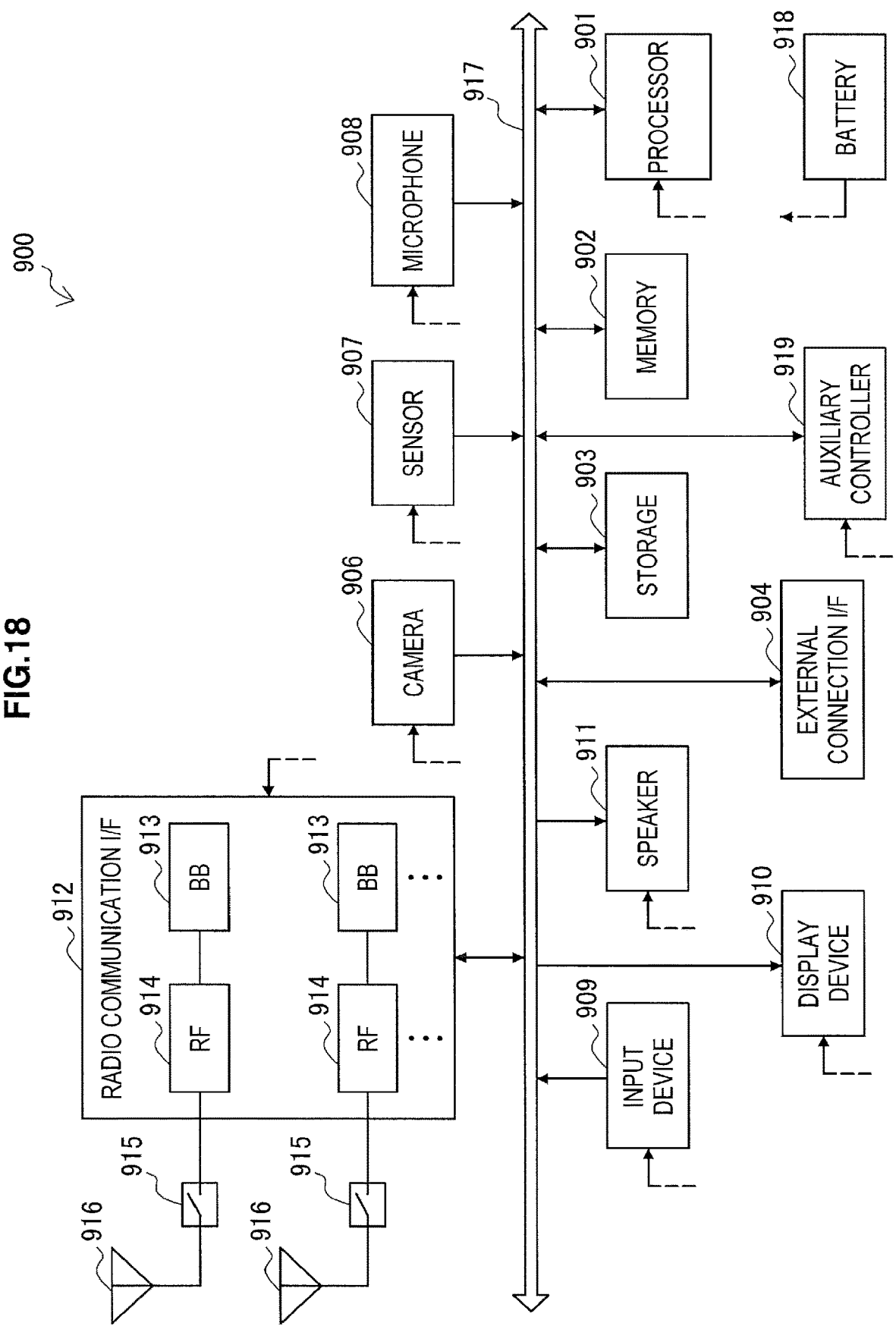
FIG. 18 is a block diagram illustrating an example of a schematic configuration of a smartphone.

FIG. 18 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include a plurality of BB processors 913 and a plurality of RF circuits 914 as illustrated in FIG. 18. Note that although FIG. 18 illustrates an example of the radio communication interface 912 including a plurality of BB processors 913 and a plurality of RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among a plurality of circuits included in the radio communication interface 912 (for example, circuits for different radio communication schemes).

Each antenna 916 includes a single or a plurality of antenna elements (for example, a plurality of antenna elements constituting a MIMO antenna), and is used by the radio communication interface 912 to transmit and receive radio signals. The smartphone 900 may also include a plurality of antennas 916 as illustrated in FIG. 18. Note that although FIG. 18 illustrates an example of the smartphone 900 including a plurality of antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 18 via power supply lines partially illustrated with dashed lines in the drawing. The auxiliary controller 919 causes minimal functions of the smartphone 900 to operate while in a sleep mode, for example.

In the smartphone 900 illustrated in FIG. 18, the information acquiring unit 161, the signal detection unit 163, the synchronization control unit 165, and the transmission control unit 167 described with reference to FIG. 5 may be implemented in the radio communication interface 912. Also, at least some of these functions may also be implemented in the processor 901 or the auxiliary controller 919.

(Second Application)

Figure 19:
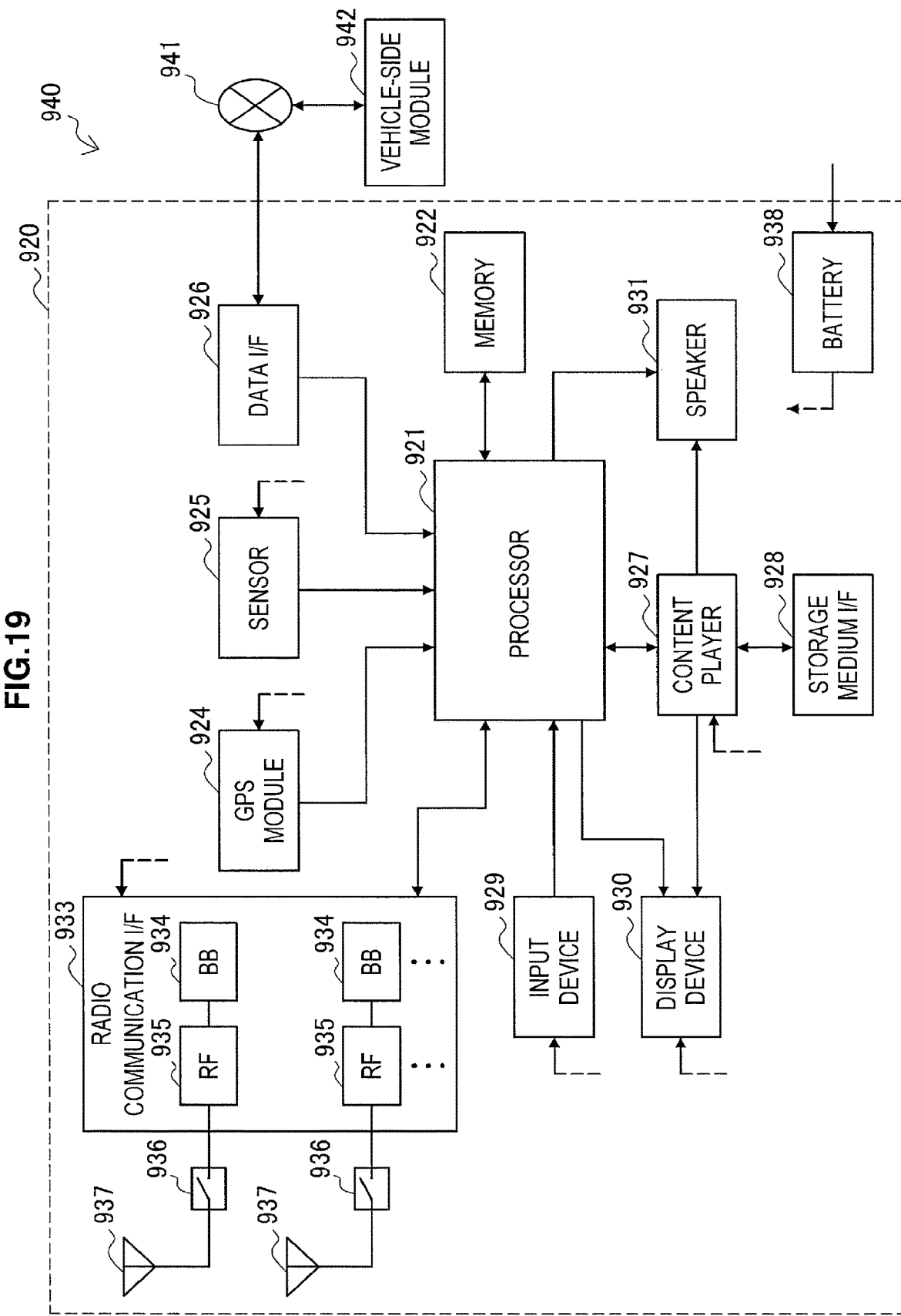
FIG. 19 is a block diagram illustrating an example of a schematic configuration of a car navigation device.

FIG. 19 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include a plurality of BB processors 934 and a plurality of RF circuits 935 as illustrated in FIG. 19. Note that although FIG. 19 illustrates an example of the radio communication interface 933 including a plurality of BB processors 934 and a plurality of RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among a plurality of circuits included in the radio communication interface 933 (for example, circuits for different radio communication schemes).

Each antenna 937 includes a single or a plurality of antenna elements (for example, a plurality of antenna elements constituting a MIMO antenna), and is used by the radio communication interface 933 to transmit and receive radio signals. The car navigation device 920 may also include a plurality of antennas 937 as illustrated in FIG. 19. Note that although FIG. 19 illustrates an example of the car navigation device 920 including a plurality of antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 19 via power supply lines partially illustrated with dashed lines in the drawing. Also, the battery 938 stores electric power supplied from the vehicle.

In the car navigation device 920 illustrated in FIG. 19, the information acquiring unit 161, the signal detection unit 163, the synchronization control unit 165, and the transmission control unit 167 described with reference to FIG. 5 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

8. CONCLUSION

In the above, each device and each process according to the embodiment of the present disclosure have been described, using FIGS. 1 to 20. According to the embodiment according to the present disclosure, the transmission control unit 167 controls the transmission of the synchronization signal for the D2D communication. Also, the radio frame used in the wireless communication with the base station 200 and the radio frame used in the D2D communication include the same frame structure. Also, the timing of the synchronization signal for the D2D communication in the above same frame structure is same as the timing of the synchronization signal for the wireless communication with the base station 200 in the above same frame structure.

Thereby, the synchronization signal for the D2D communication transmitted by the terminal device 100 is capable of being received by another terminal device 100, with the same reception operation as the reception operation with respect to the synchronization signal transmitted by the base station 200 (the synchronization signal for the wireless communication with the base station 200). Hence, another terminal device 100 is needless to perform different operations, when receiving the synchronization signal for the wireless communication with the base station 200, and when receiving the synchronization signal for the D2D communication transmitted by the terminal device 100. That is, the operation of the terminal device for performing the D2D communication 100 in which the same communication scheme as the communication scheme of the cellular communication is adopted is simplified more.

For example, the transmission control unit 167 controls the timing to transmit the synchronization signal for the D2D communication, on the basis of the timing of the synchronization signal obtained by the detection of the synchronization signal for the wireless communication with the base station 200.

As the first example, the transmission control unit 167 controls the timing to transmit the above synchronization signal for the above inter-device communication, in such a manner to set at the timing a predetermined time after the timing of the synchronization signal obtained by the detection of the synchronization signal for the wireless communication with the base station 200.

Thereby, the synchronization signal transmitted by the base station 100 in the cell 21 and the synchronization signal for the D2D communication by the terminal device 100 are transmitted at different timings. As a result, for example, the synchronization signal for the D2D communication transmitted by the terminal device 100 does not interfere with the synchronization signal transmitted by the base station 100. Hence, the possibility that the synchronization fails in the cell 21 is prevented from increasing.

As the second example, the transmission control unit 167 may control the timing to transmit the synchronization signal for the D2D communication, in such a manner to set at the same timing as the timing of the synchronization signal obtained by the detection of the synchronization signal for the wireless communication with the base station 200.

Thereby, the synchronization signal transmitted by the base station 100 in the cell 21 and the synchronization signal for the D2D communication by the terminal device 100 are transmitted at the same timing. As a result, for example, the same timing as the cellular communication is used for the D2D communication as well, in the cell 21 and its vicinity. Hence, the control of the D2D communication by the base station 200 can be simplified more.

According to the first exemplary variant, the synchronization signal for the wireless communication with the base station 200 is the signal corresponding to one cell ID among one or more cell IDs. On the other hand, the synchronization signal for the D2D communication transmitted by the terminal device 100 is the signal corresponding to one D2D communication ID among one or more D2D communication IDs different from the above one or more cell IDs.

Thereby, another terminal device 100, which detects the synchronization signal, can determine which synchronization signal has been detected. Hence, the other terminal device 100 can decide the operation after the acquisition of the synchronization.

According to the second exemplary variant, the transmission control unit 167 controls the transmission of the discovery signal with which the terminal device 100 can be discovered for the purpose of the D2D communication. Also, the above discovery signal is the signal corresponding to the above one D2D communication ID (the D2D communication ID corresponding to the synchronization signal for the D2D communication) among one or more D2D communication IDs.

Thereby, for example, the terminal device which has received the discovery signal can determine whether the terminal device which has transmitted the discovery signal is the same device as the terminal device which has transmitted the synchronization signal. For example, this enables the terminal device which has received the discovery signal, to transmit the acknowledgement signal when the discovery signal is transmitted by the terminal device which has transmitted the synchronization signal, and to not transmit the acknowledgement signal when the above discovery signal is transmitted by the terminal device different from the terminal device which has transmitted the synchronization signal. As a result, the waste of the radio resources can be reduced.

Also, the D2D communication ID is utilized as the synchronization group ID for identifying the synchronization group, and the terminal devices 100 that belong to the same synchronization group can transmit the discovery signal corresponding to the synchronization group ID. In this case, for example, according to the second exemplary variant, the terminal device which has received the discovery signal can determine whether the terminal device which has transmitted the discovery signal belongs to the same synchronization group as the terminal device which has transmitted the synchronization signal. For example, this enables the terminal device which has received the discovery signal, to transmit the acknowledgement signal when the discovery signal is transmitted by the terminal device that belongs to the same synchronization group, and to not transmit the acknowledgement signal when the above discovery signal is transmitted by the terminal device that belongs to another synchronization group. As a result, the waste of the radio resources can be reduced.

According to the third exemplary variant, the synchronization signal for the D2D communication transmitted by the terminal device 100 is the signal corresponding to one D2D communication ID among a plurality of D2D communication IDs different from the above one or more cell IDs. Then, the transmission control unit 167 changes the synchronization signal for the D2D communication, from the signal corresponding to one D2D communication ID among a plurality of D2D communication IDs, to the signal corresponding to another D2D communication ID among the above plurality of D2D communication IDs, in response to the notification from another terminal device 100.

Thereby, the synchronization signal can be changed, when the same synchronization signal is transmitted by two or more terminal devices 100, and another terminal device 100 becomes unable to acquire synchronization actually, for example. Hence, the above other terminal device 100 is prevented from being unable to acquire synchronization continually. Also, for example, the synchronization signal is changed only when necessary, and therefore a situation in which frequent reacquisition of the synchronization is necessary is prevented.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, although an example in which the communication system is compliant with LTE, LTE-Advanced, or equivalent communication schemes has been described in the above embodiment, the present disclosure is not limited to such an example. For example, the communication system may be a system compliant with other communication standards.

Also, although an example in which the D2D communication is performed in OFDM has been described in the above embodiment, the present disclosure is not limited to such an example. For example, instead of the D2D communication in OFDM, the D2D communication may be performed in SC-FDMA. Also, when another multiplexing scheme is adopted for the wireless communication between the base station and the terminal device, the D2D communication may be performed by the other multiplexing scheme.

Also, the processing steps in each process in this specification are not strictly limited to being executed in a time series following the sequence described in a sequence diagram or a flowchart. For example, the processing steps in each process may be executed in a sequence that differs from a sequence described herein as a flowchart, and furthermore may be executed in parallel.

Also, a computer program for causing hardware, such as a CPU, a ROM, and a RAM, equipped in the terminal device to provide the function equivalent to each configuration of the above terminal device can be created. Also, a storage medium storing the computer program may be provided. Also, an information processing apparatus (for example, a processing circuit, a chip) including a memory (for example, a ROM and RAM) storing the computer program and a processor (for example, a CPU) for executing the computer program may be provided.

Also, the effects described in the present specification are only descriptive or illustrative, and is not limitative. That is, the technology according to the present disclosure can achieve another effect that is obvious for a skilled person from the description of the present specification, in addition to the above effect or instead of the above effect.

Additionally, the present technology may also be configured as below.

(1)

A terminal device including:

a detection unit configured to detect a synchronization signal for wireless communication with a base station; and a control unit configured to control transmission of a synchronization signal for inter-device communication, wherein a radio frame used in the wireless communication with the base station and a radio frame used in the inter-device communication have a same frame structure, and a timing of the synchronization signal for the inter-device communication in the same frame structure is same as a timing of the synchronization signal for the wireless communication with the base station in the same frame structure.

(2)

The terminal device according to (1), wherein the control unit controls a timing to transmit the synchronization signal for the inter-device communication, on the basis of the timing of the synchronization signal obtained by detection of the synchronization signal for the wireless communication with the base station.

(3)

The terminal device according to (2), wherein the control unit controls the timing to transmit the synchronization signal for the inter-device communication to be set at a timing a predetermined time after the timing of the synchronization signal obtained by the detection.

(4)

The terminal device according to (3), wherein the radio frame includes a plurality of subframes, and the predetermined time is a time corresponding to a predetermined number of the subframes.

(5)

The terminal device according to (2), wherein the control unit controls the timing to transmit the synchronization signal for the inter-device communication to be set at a same timing as the timing of the synchronization signal obtained by the detection.

(6)

The terminal device according to any one of (2) to (5), wherein the control unit controls the timing to transmit the synchronization signal for the inter-device communication, on the basis of the timing of the synchronization signal obtained by the detection, when a position condition of the terminal device is satisfied.

(7)

The terminal device according to (6), wherein the position condition includes a condition that the terminal device is positioned at a cell edge of a cell formed by the base station.

(8)

The terminal device according to (7), wherein the position condition includes a condition that the terminal device is not positioned at a vicinity of an adjacent cell of the cell.

(9)

The terminal device according to any one of (1) to (8), wherein the synchronization signal for the wireless communication with the base station is a signal corresponding to one identifier among one or more identifiers for identifying a cell formed by the base station, and the synchronization signal for the inter-device communication is a signal corresponding to one identifier among one or more other identifiers that are different from the one or more identifiers.

(10)

The terminal device according to (9), wherein the control unit controls transmission of a discovery signal with which the terminal device can be discovered for the inter-device communication, and the discovery signal is a signal corresponding to the one identifier among the one or more other identifiers.

(11)

The terminal device according to (10), wherein the discovery signal includes the one identifier among the one or more other identifiers.

(12)

The terminal device according to (10), wherein the discovery signal is one of one or more signals corresponding to the one identifier among the one or more other identifiers.

(13)

The terminal device according to any one of (9) to (12), wherein the synchronization signal for the inter-device communication is a signal corresponding to one identifier among a plurality of other identifiers that are different from the one or more identifiers, and the control unit changes the synchronization signal for the inter-device communication, from a signal corresponding to one identifier among the plurality of other identifiers, to a signal corresponding to another identifier among the plurality of other identifiers, in response to a notification from another terminal device.

(14)

The terminal device according to any one of (9) to (12), wherein the synchronization signal for the inter-device communication is a signal corresponding to one identifier among a plurality of other identifiers that are different from the one or more identifiers, and the control unit periodically changes the synchronization signal for the inter-device communication, from a signal corresponding to one identifier among the plurality of other identifiers, to a signal corresponding to another identifier among the plurality of other identifiers.

(15)

An information processing apparatus including:

one or more processors; and a memory configured to store a program executed by the one or more processors, wherein the program is a program for executing detecting a synchronization signal for wireless communication with a base station, and controlling transmission of a synchronization signal for inter-device communication, and wherein a radio frame used in the wireless communication with the base station and a radio frame used in the inter-device communication have a same frame structure, and a timing of the synchronization signal for the inter-device communication in the same frame structure is same as a timing of the synchronization signal for the wireless communication with the base station in the same frame structure.

(16)

A terminal device including:

a detection unit configured to detect a synchronization signal for inter-device communication transmitted by another terminal device; and a control unit configured to acquire synchronization for the inter-device communication, on the basis of a detection result of the synchronization signal, wherein a radio frame used in wireless communication with a base station and a radio frame used in the inter-device communication have a same frame structure, and a timing of the synchronization signal for the inter-device communication in the same frame structure is same as a timing of the synchronization signal for the wireless communication with the base station in the same frame structure.

(17)

The terminal device according to (16), wherein the detection unit detects the synchronization signal for the wireless communication with the base station, and the control unit acquires the synchronization for the inter-device communication, on the basis of a detection result of the synchronization signal for the wireless communication with the base station, when the terminal device is positioned in a cell formed by the base station, and acquires the synchronization for the inter-device communication, on the basis of a detection result of the synchronization signal for the inter-device communication, when the terminal device is not positioned in the cell.

(18)

The terminal device according to (16) or (17), wherein the synchronization signal for the wireless communication with the base station is a signal corresponding to one identifier among one or more identifiers for identifying a cell formed by the base station, and the synchronization signal for the inter-device communication is a signal corresponding to one identifier among one or more other identifiers that are different from the one or more identifiers.

(19)

The terminal device according to (18), wherein the synchronization signal for the inter-device communication is a signal corresponding to one identifier among a plurality of other identifiers that are different from the one or more identifiers, and the terminal device further includes an acquisition unit that acquires priority information indicating a priority of detection among signals corresponding to the plurality of other identifiers, and the detection unit detects the synchronization signal for the inter-device communication in accordance with the priority.

(20)

The terminal device according to (19), wherein the acquisition unit acquires first priority information indicating the priority and second priority information indicating the priority, and each of the first priority information and the second priority information includes information indicating an acquisition time or an acquisition site when provided by the base station, and the acquisition unit selects one of the first priority information and the second priority information, on the basis of information of the acquisition time or the acquisition site included in the first priority information and the second priority information, and the detection unit detects the synchronization signal for the inter-device communication, in accordance with the priority indicated by the one of the first priority information and the second priority information.

REFERENCE SIGNS LIST 1 communication system
21 cell
51 radio frame
53 subframe
55 slot
57 symbol
100 terminal device
161 information acquiring unit
163 signal detection unit
165 synchronization control unit
167 transmission control unit
200 base station
251 information providing unit
253 transmission control unit

The invention claimed is:

1. A terminal device comprising:
circuitry configured to
detect a first synchronization signal transmitted according to a first identifier included in the first synchronization signal, the first identifier being selected from among a first subset of synchronization signal identifiers;
detect a second synchronization signal according to a second identifier included in the second synchronization signal, the second identifier being selected from among a second subset of synchronization signal identifiers, and the first subset of the identifiers being different from the second subset of the identifiers;
acquire synchronization for performing device-to-device (D2D) communication based on at least one of the first synchronization signal or the second synchronization signal;
acquire priority information indicating a priority of detection among signals corresponding to the second subset of the identifiers, wherein the priority information includes information indicating an acquisition time or an acquisition site of the priority information; and
detect the second synchronization signal for the wireless communication with another terminal device in accordance with the priority.

2. The terminal device of claim 1, wherein
the circuitry is configured to control a timing to transmit the synchronization signal for D2D communication based on the detected first synchronization signal.

3. The terminal device according to claim 2, wherein
the circuitry is configured to control the timing to transmit the synchronization signal for the D2D communication to be a predetermined time after a timing of the first synchronization signal.

4. The terminal device of claim 3, wherein
the frame structure includes a plurality of subframes, and the predetermined time is a time corresponding to a predetermined number of the subframes.

5. The terminal device of claim 1, wherein
the circuitry is configured to control a timing to transmit the synchronization signal for the D2D communication based on a timing of the first or the second synchronization signal and a position condition of the terminal device.

6. The terminal device of claim 5, wherein
the position condition of the terminal device indicates whether terminal device is positioned in a cell formed by a base station.

7. The terminal device of claim 6, wherein
the circuitry is configured to control the timing to transmit the synchronization signal for the D2D communication based on the second synchronization signal when the position condition of the terminal device indicates that the terminal device is not positioned in a cell formed by the base station.

8. The terminal device of claim 6, wherein
the circuitry is configured to control the timing to transmit the synchronization signal for the D2D communication based on the first synchronization signal when the position condition of the terminal device indicates that the terminal device is positioned in a cell formed by the base station.

9. The terminal device of claim 1, wherein
the circuitry is configured to select a synchronization reference among a plurality of synchronization signals from one or more other terminal devices in accordance with priority information.

10. The terminal device of claim 9, wherein
the circuitry is configured to obtain the priority information via system information or radio resource control (RRC) signaling.

11. A wireless communication method comprising:
detecting a first synchronization signal transmitted according to a first identifier included in the first synchronization signal, the first identifier selected being from among a first subset of synchronization signal identifiers;
detecting a second synchronization signal according to a second identifier included in the second synchronization signal, the second identifier being selected from among a second subset of synchronization signal identifiers, and the first subset of identifiers being different from the second subset of identifiers;
acquiring synchronization for performing device-to-device (D2D) communication based on at least one of the first synchronization signal or the second synchronization signal;
acquiring priority information indicating a priority of detection among signals corresponding to the second subset of the identifiers, wherein the priority information includes information indicating an acquisition time or an acquisition site of the priority information; and
detecting the second synchronization signal for the wireless communication with another terminal device in accordance with the priority.

12. A terminal device comprising:
circuitry configured to:
detect from a received radio signal a detected synchronization signal;
determine a transmission device of the detected synchronization signal being a base station when an identifier included in the detected synchronization signal falls within a first subset of identifiers;

determine the transmission device of the detected synchronization signal being another terminal device when the identifier included in the detected synchronization signal falls within a second subset of identifiers, the first subset of the identifiers and the second subset of the identifiers corresponding to different portions of identifiers;

acquire synchronization for performing device-to-device (D2D) communication with the other terminal device according to the first synchronization signal or the second synchronization signal and the determined transmission device;

acquire priority information indicating a priority of detection among signals corresponding to the second subset of the identifiers, wherein the priority information includes information indicating an acquisition time or an acquisition site of the priority information;

detect the second synchronization signal for the wireless communication with the other terminal device in accordance with the priority; and perform the device-to-device (D2D) communication with the other terminal device after acquisition of the synchronization.

13. The terminal device of claim 12, wherein the circuitry is further configured to:

determine a position of the terminal device with respect to a first cell defined according to the base station and a second cell that is adjacent to the first cell; and transmit another synchronization signal when the determined position is at a cell edge of the first cell, and is not within the second cell and not at an adjacent vicinity of the second cell.

14. A communications system, comprising:

a base station; and a terminal device including:

circuitry configured to detect a first synchronization signal transmitted by the base station, the first synchronization signal having a first identification selected from among a first subset of a plurality of identifiers;

detect a second synchronization signal transmitted by another terminal device, the second synchronization signal having a second identification selected from among a second subset of a plurality of synchronization identifiers, wherein the first subset of identifiers is different from the second subset of identifiers;

acquire synchronization for performing device-to-device (D2D) communication based on at least one of the first synchronization signal or the second synchronization signal;

control transmission of a synchronization signal for the D2D communication according to a frame structure that is used in the wireless communication with the base station and the D2D communication;

acquire priority information indicating a priority of detection among signals corresponding to the second subset of identifiers, wherein the priority information includes information indicating an acquisition time or an acquisition site of the priority information; and detect the second synchronization signal for the wireless communication with the another terminal device in accordance with the priority.

* * * * *